United States Patent
Minnick et al.

(10) Patent No.: US 8,430,302 B2
(45) Date of Patent: Apr. 30, 2013

(54) ENABLING INTERACTIVE ACTIVITIES FOR CONTENT UTILIZING MATRIX CODES

(75) Inventors: Dan J. Minnick, Littleton, CO (US); David A. Kummer, Highlands Ranch, CO (US); John T. Kennedy, Denver, CO (US); Max S. Gratton, Lakewood, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 118 days.

(21) Appl. No.: 13/020,678

(22) Filed: Feb. 3, 2011

(65) Prior Publication Data

US 2012/0199643 A1 Aug. 9, 2012

(51) Int. Cl.
*G06F 17/00* (2006.01)

(52) U.S. Cl.
USPC .............................. 235/375; 235/494; 725/135

(58) Field of Classification Search .......................... None
See application file for complete search history.

(56) References Cited

U.S. PATENT DOCUMENTS

| | | | |
|---|---|---|---|
| 5,510,603 A | 4/1996 | Hess et al. | |
| 5,581,636 A | 12/1996 | Skinger | |
| 5,703,349 A | 12/1997 | Meyerson et al. | |
| 5,978,855 A | 11/1999 | Metz et al. | |
| 6,006,990 A | 12/1999 | Ye et al. | |
| 6,058,238 A | 5/2000 | Ng | |
| 6,556,273 B1 | 4/2003 | Wheeler et al. | |
| 7,206,409 B2 | 4/2007 | Antonellis et al. | |
| 7,328,848 B2 | 2/2008 | Xia et al. | |
| 7,394,519 B1 | 7/2008 | Mossman et al. | |
| 7,424,976 B2 | 9/2008 | Muramatsu | |
| 7,604,172 B2 | 10/2009 | Onogi | |
| 7,624,417 B2 | 11/2009 | Dua | |
| 7,624,916 B2 | 12/2009 | Sato et al. | |
| 7,673,297 B1 | 3/2010 | Arsenault et al. | |

(Continued)

FOREIGN PATENT DOCUMENTS

| | | |
|---|---|---|
| CN | 1571503 A | 1/2005 |
| CN | 101 227 581 A | 7/2008 |

(Continued)

OTHER PUBLICATIONS

"Android App Reviews & Showcase Just a Tapp Away," Android Tapp, 10 pp. Found online at http://www.androidtapp.com/download-the-weather-channel-android-app-from-your-tv/, Oct. 22, 2010.

(Continued)

*Primary Examiner* — Thien M Le
*Assistant Examiner* — Sonji Johnson
(74) *Attorney, Agent, or Firm* — Kilpatrick Townsend & Stockton LLP

(57) ABSTRACT

An electronic device may generate a matrix code that includes information for performing an interactive activity related to content, combine the matrix code with the content, and transmit the combination of the matrix code and the content to a display device. Subsequently, the displayed matrix code may be captured by a matrix code reader in order to initiate performance of the interactive activity. In some implementations, the content may be a sporting event and capture of the matrix code may initiate performance of an activity corresponding to a fantasy sporting event league associated with the sporting event. In various implementations, the matrix code reader's initiation of performance of the interactive activity related to the content may utilize one or more other electronic devices located in a user location.

16 Claims, 17 Drawing Sheets

U.S. PATENT DOCUMENTS

| | | |
|---|---|---|
| 7,797,430 B2 | 9/2010 | Ichieda |
| 7,841,531 B2 | 11/2010 | Onogi |
| 2001/0037297 A1 | 11/2001 | McNair |
| 2002/0027612 A1 | 3/2002 | Brill et al. |
| 2002/0049980 A1 | 4/2002 | Hoang |
| 2002/0112250 A1 | 8/2002 | Koplar et al. |
| 2003/0050854 A1 | 3/2003 | Showghi et al. |
| 2003/0121978 A1 | 7/2003 | Rubin et al. |
| 2003/0172374 A1 | 9/2003 | Vinson et al. |
| 2004/0019691 A1 | 1/2004 | Daymond et al. |
| 2004/0044532 A1 | 3/2004 | Karstens |
| 2005/0015800 A1 | 1/2005 | Holcomb |
| 2005/0125301 A1 | 6/2005 | Muni |
| 2005/0262548 A1 | 11/2005 | Shimojo et al. |
| 2005/0264694 A1 | 12/2005 | Ilan et al. |
| 2006/0079247 A1 | 4/2006 | Ritter |
| 2006/0086796 A1 | 4/2006 | Onogi |
| 2006/0124742 A1 | 6/2006 | Rines et al. |
| 2006/0196950 A1 | 9/2006 | Kiliccote |
| 2006/0265731 A1 | 11/2006 | Matsuda |
| 2007/0016934 A1 | 1/2007 | Okada et al. |
| 2007/0016936 A1 | 1/2007 | Okada et al. |
| 2007/0017350 A1 | 1/2007 | Uehara |
| 2007/0019215 A1 | 1/2007 | Yu |
| 2007/0063050 A1 | 3/2007 | Attia et al. |
| 2007/0073585 A1 | 3/2007 | Apple et al. |
| 2007/0206020 A1 | 9/2007 | Duffield et al. |
| 2007/0256118 A1 | 11/2007 | Nomura et al. |
| 2008/0022323 A1 | 1/2008 | Koo |
| 2008/0059998 A1 | 3/2008 | McClenny et al. |
| 2008/0062164 A1 | 3/2008 | Bassi et al. |
| 2008/0077324 A1 * | 3/2008 | Hatano et al. .................. 701/212 |
| 2008/0092154 A1 | 4/2008 | Hogyoku |
| 2008/0156879 A1 | 7/2008 | Melick et al. |
| 2008/0189185 A1 | 8/2008 | Matsuo et al. |
| 2008/0200153 A1 | 8/2008 | Fitzpatrick et al. |
| 2008/0200160 A1 | 8/2008 | Fitzpatrick et al. |
| 2008/0201078 A1 | 8/2008 | Fitzpatrick et al. |
| 2008/0267537 A1 | 10/2008 | Thuries |
| 2008/0281624 A1 | 11/2008 | Shibata |
| 2009/0031373 A1 | 1/2009 | Hogyoku |
| 2009/0083808 A1 | 3/2009 | Morrison |
| 2009/0108057 A1 | 4/2009 | Mu et al. |
| 2009/0154759 A1 | 6/2009 | Koskinen et al. |
| 2009/0157511 A1 | 6/2009 | Spinnell et al. |
| 2009/0157530 A1 | 6/2009 | Nagamoto et al. |
| 2009/0172780 A1 | 7/2009 | Sukeda et al. |
| 2009/0179852 A1 | 7/2009 | Refai et al. |
| 2009/0180025 A1 | 7/2009 | Dawson |
| 2009/0212112 A1 | 8/2009 | Li |
| 2009/0212113 A1 | 8/2009 | Chiu et al. |
| 2009/0254954 A1 | 10/2009 | Jeong |
| 2009/0303036 A1 | 12/2009 | Sahuguet |
| 2009/0312105 A1 | 12/2009 | Koplar |
| 2010/0017457 A1 | 1/2010 | Jumpertz et al. |
| 2010/0020970 A1 | 1/2010 | Liu et al. |
| 2010/0031162 A1 | 2/2010 | Wiser et al. |
| 2010/0036936 A1 | 2/2010 | Cox et al. |
| 2010/0053339 A1 | 3/2010 | Aaron et al. |
| 2010/0081375 A1 | 4/2010 | Rosenblatt et al. |
| 2010/0089996 A1 | 4/2010 | Koplar |
| 2010/0096448 A1 | 4/2010 | Melick et al. |
| 2010/0129057 A1 | 5/2010 | Kulkarni |
| 2010/0131900 A1 | 5/2010 | Spetalnick |
| 2010/0131970 A1 | 5/2010 | Falcon |
| 2010/0131983 A1 | 5/2010 | Shannon et al. |
| 2010/0154035 A1 | 6/2010 | Damola et al. |
| 2010/0161437 A1 | 6/2010 | Pandey |
| 2010/0163613 A1 * | 7/2010 | Bucher et al. .................. 235/375 |
| 2010/0201894 A1 | 8/2010 | Nakayama et al. |
| 2010/0217663 A1 | 8/2010 | Ramer et al. |
| 2010/0261454 A1 | 10/2010 | Shenfield et al. |
| 2010/0262924 A1 | 10/2010 | Kalu |
| 2010/0262992 A1 | 10/2010 | Casagrande |
| 2010/0279710 A1 | 11/2010 | Dicke et al. |
| 2010/0295868 A1 | 11/2010 | Zahnert et al. |
| 2010/0301115 A1 | 12/2010 | Berkun |
| 2011/0039573 A1 | 2/2011 | Hardie |
| 2011/0065451 A1 | 3/2011 | Danado et al. |
| 2011/0208710 A1 | 8/2011 | Lesavich |
| 2011/0264527 A1 | 10/2011 | Fitzpatrick et al. |
| 2011/0282727 A1 | 11/2011 | Phan et al. |
| 2012/0128267 A1 | 5/2012 | Dugan et al. |
| 2012/0130851 A1 | 5/2012 | Minnick et al. |
| 2012/0131416 A1 | 5/2012 | Dugan et al. |
| 2012/0137318 A1 | 5/2012 | Kilaru et al. |
| 2012/0138671 A1 | 6/2012 | Gaede et al. |
| 2012/0139826 A1 | 6/2012 | Beals et al. |
| 2012/0142322 A1 | 6/2012 | Gomez |
| 2012/0151293 A1 | 6/2012 | Beals |
| 2012/0151524 A1 | 6/2012 | Kilaru et al. |
| 2012/0153015 A1 | 6/2012 | Gomez et al. |
| 2012/0155838 A1 | 6/2012 | Gerhards et al. |
| 2012/0159563 A1 | 6/2012 | Gomez et al. |
| 2012/0168510 A1 | 7/2012 | Gratton |
| 2012/0169928 A1 | 7/2012 | Casagrande et al. |
| 2012/0175416 A1 | 7/2012 | Gomez et al. |
| 2012/0181329 A1 | 7/2012 | Gratton et al. |
| 2012/0182320 A1 | 7/2012 | Beals et al. |
| 2012/0188112 A1 | 7/2012 | Beals et al. |
| 2012/0188442 A1 | 7/2012 | Kennedy |
| 2012/0198572 A1 | 8/2012 | Beals et al. |

FOREIGN PATENT DOCUMENTS

| | | |
|---|---|---|
| DE | 10 2007 038 810 A1 | 2/2009 |
| EP | 1 021 035 A1 | 7/2000 |
| EP | 1 383 071 A2 | 1/2004 |
| EP | 1 724 695 A1 | 11/2006 |
| EP | 1 768 400 A2 | 3/2007 |
| EP | 2 079 051 A1 | 7/2009 |
| EP | 2 131 289 A1 | 12/2009 |
| EP | 2 439 936 A2 | 4/2012 |
| FR | 2 565 748 A1 | 12/1985 |
| GB | 2 044 446 A | 10/1980 |
| GB | 2 165 129 A | 4/1986 |
| GB | 2 325 765 A | 12/1998 |
| GB | 2 471 567 A | 1/2011 |
| JP | 2008 244556 A | 10/2008 |
| KR | 2004 0087776 A | 10/2004 |
| WO | 95/27275 A1 | 10/1995 |
| WO | 97/41690 A1 | 11/1997 |
| WO | 01/18589 A1 | 3/2001 |
| WO | 2005/109338 A1 | 11/2005 |
| WO | 2007/009005 A1 | 1/2007 |
| WO | 2009/057651 | 5/2009 |
| WO | 2009/144536 A1 | 12/2009 |
| WO | 2011/009055 A2 | 1/2011 |
| WO | 01/58146 A2 | 8/2011 |

OTHER PUBLICATIONS

"Can Mobile Barcodes Work on TV?," India and Asia Pacific Mobile Industry Reports, Sep. 2009, 4 pp. Found online at http://www.gomonews.com/can-mobile-barcodes-work-on-tv/, Oct. 22, 2010.

"FOX TV Uses QR Codes," 2d Barcode Strategy, Sep. 2010, 6 pp. Found online at http://www.2dbarcodestrategy.com/2010/09/fox-tv-uses-qr-codes.html, Oct. 22, 2010.

"FOX's Fringe Uses QR Code," 2d Barcode Strategy, Oct. 2010, 4 pp. Found on the Internet at http://www.2dbarcodestrategy.com/2010/10/foxs-fringe-uses-qr-code.html, Oct. 22, 2010.

"Mobile Paths: QR Codes Come to TV," Mobile Behavior: An Omnicom Group Company, Sep. 2010, 8 pp. Found online at http://www.mobilebehavior.com/2010/09/27/mobile-paths-qr-codes-come-to-tv, Oct. 22, 2010.

"What Can I Do with the QR Barcode," Search Magnet Local-QR Barcode Technology, 2 pp. Found online at http://www.searchmagnetlocal.com/qr_barcode_technology.html, Oct. 22, 2010.

Kartina Costedio, "Bluefly QR Codes Debut on TV," 2 pp. Found online at http://www.barcode.com/Mobile-Barcode-News/bluefly-qr-codes-debut-on-tv.html, Oct. 22, 2010.

Gao, J. et al., "A 2D Barcode-Based Mobile Payment System," Multimedia and Ubiquitous Engineering, 2009, 10 pp. Found online at http://ieeexplore.ieee.org/Xplore/login.jsp?url=http%3A%2F%2Fieeexplore.ieee.org%2Fie . . . , Oct. 22, 2010.

Smith, Lindsay, "Barcodes Make History on Global TV", 3 pp. Found online at http://www.lindsaysmith.com/worlds-first-mobio-mini-telethon/, Oct. 22, 2010.

Nghee, Seah Y., "Data Transmission Between PDA and PC Using WIFI for Pocket Barcode Application", Thesis, University Teknologi Malaysia, May 2007, 126 pp. Found online at http://eprints.utm.my/6421/1/SeahYeowNgeeMFKE20007TTT.pdf, Oct. 22, 2010.

Olson, Elizabeth, "Bar Codes Add Detail on Items in TV Ads," New York Times, Sep. 2010, 3 pp. Found online at http:www.nytimes.com/2010/09/27/business/media/27bluefly.html?src=busln, Oct. 22, 2010.

Rekimoto, Jun et al., "Augment-able Reality: Situated Communication Through Physical and Digital Spaces", Sony Computer Science Laboratory, 2002, 8 pp. Found online at Citeseer: 10.1.1.20.34[1].pdf, Oct. 22, 2010.

Silverstein, Barry, "QR Codes and TV Campaigns Connect," ReveNews, Sep. 2010, 5 pp. Found online at http://www.revenews.com/barrysilverstein/qr-codes-and-tv-campaigns-connect/, Oct. 22, 2010.

Yamanari, Tomofumi et al., "Electronic Invisible Code Display Unit for Group Work on Reminiscence Therapy," Proceedings of the International MultiConference of Engineers and Computer Scientists 2009, vol. I, IMECS 2009, Mar. 2009, 6 pp. Retrieved from Internet: http://citeseerx.ist.psu.edu/viewdoc/download?doi=10.1.1.148.6904&rep1&type=pdf.

International Search Report and Written Opinion of PCT/US11/59977 mailed on Mar. 19, 2012, 7 pages.

International Search Report and Written Opinion of PCT/US11/60002 mailed on Feb. 15, 2012, 7 pages.

International Search Report and Written Opinion of PCT/US11/60104 mailed on Mar. 29, 2012, 9 pages.

International Search Report and Written Opinion of PCT/US11/60121 mailed on Feb. 14, 2012, 7 pages.

International Search Report and Written Opinion of PCT/US11/61074 mailed on Jan. 6, 2012, 11 pages.

International Search Report and Written Opinion of PCT/US11/61211 mailed on Mar. 29, 2012, 8 pages.

International Search Report and Written Opinion of PCT/US11/61773 mailed on Feb. 21, 2012, 7 pages.

International Search Report and Written Opinion of PCT/US11/61778 mailed on Mar. 2, 2012, 7 pages.

International Search Report and Written Opinion of PCT/US11/63111 mailed on Apr. 4, 2012, 9 pages.

International Search Report and Written Opinion of PCT/US11/64709 mailed on Apr. 10, 2012, 8 pages.

International Search Report and Written Opinion of PCT/US2011/060098 mailed on Mar. 29, 2012, 10 pages.

International Search Report and Written Opinion of PCT/US2011/063308 mailed on Mar. 29, 2012, 10 pages.

International Search Report and Written Opinion of PCT/US2011/068176 mailed on Mar. 29, 2012, 15 pages.

Ngee, S., "Data Transmission Between PDA and PC Using WiFi for Pocket Barcode Application," Thesis, University Teknologi Malaysia, May 2007, 126 pp. Found online at http://eprints.utm.my/6421/1/SeahYeowNgeeMFKE20007TTT.pdf, Oct. 22, 2010.

U.S. Appl. No. 12/961,369, filed Dec. 6, 2010, Office Action mailed Mar. 9, 2012, 17 pages.

U.S. Appl. No. 12/971,349, filed Dec. 17, 2010, Office Action mailed Nov. 10, 2011, 9 pages.

U.S. Appl. No. 12/971,349, filed Dec. 17, 2010, Final Office Action mailed Jan. 20, 2012, 10 pages.

U.S. Appl. No. 12/986,721, filed Jan. 7, 2011, Office Action mailed Mar. 16, 2012, 6 pages.

Byford, D., "Universal Interactive Device," International Business Machines Corporation, Jun. 1998, 1 page.

International Search Report and Written Opinion of PCT/US11/60094 mailed on Mar. 30, 2012, 7 pages.

International Search Report of PCT/US11/60109 mailed on Feb. 14, 2012, 3 pages.

International Search Report and Written Opinion of PCT/US2011/068161 mailed on Jun. 14, 2012, 19 pages.

International Search Report and Written Opinion of PCT/US2012/021657 mailed on May 23, 2012, 12 pages.

International Search Report and Written Opinion of PCT/US2012/022405 mailed on Apr. 19, 2012, 11 pages.

International Search Report and Written Opinion of PCT/US2012/024923 mailed on May 22, 2012, 12 pages.

International Search Report and Written Opinion of PCT/US2012/024956 mailed on Jun. 11, 2012, 10 pages.

International Search Report and Written Opinion of PCT/US2012/025502 mailed Jun. 8, 2012, 13 pages.

International Search Report and Written Opinion of PCT/US2012/025607 mailed Jun. 8, 2012, 13 pages.

International Search Report and Written Opinion of PCT/US2012/025634 mailed on May 7, 2012, 8 pages.

International Search Report and Written Opinion of PCT/US2012/026373 mailed Jun. 13, 2012, 14 pages.

International Search Report and Written Opinion of PCT/US2012/026733 mailed Jun. 28, 2012, 11 pages.

Schmitz, A., et al., "Ad-Hoc Multi-Displays for Mobile Interactive Applications," 31st Annual Conference of the European Association for Computer Graphics (Eurographics 2010), May 2010, vol. 29, No. 2, 8 pages.

Yang, C., et al., "Embedded Digital Information Integrated by Video-on-Demand System," Proceedings of the Fourth International Conference on Networked Computing and Advanced Information Management, IEEE Computer Society, 2008, 6 pages.

U.S. Appl. No. 12/971,349, filed Dec. 17, 2010, Office Action mailed Jul. 16, 2012, 11 pages.

U.S. Appl. No. 12/984,385, filed Jan. 4, 2012, Office Action mailed Jul. 12, 2012, 16 pages.

U.S. Appl. No. 12/986,721, filed Jan. 7, 2011, Notice of Allowance mailed Jun. 21, 2012, 7 pages.

U.S. Appl. No. 13/035,525, filed Feb. 25, 2011, Office Action mailed Jul. 18, 2012, 15 pages.

* cited by examiner

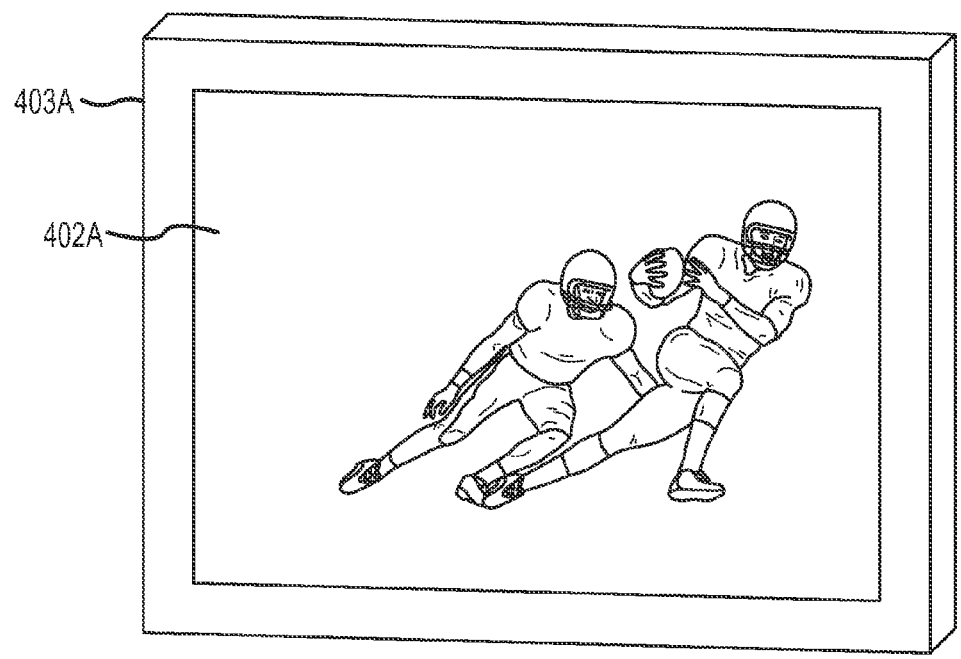
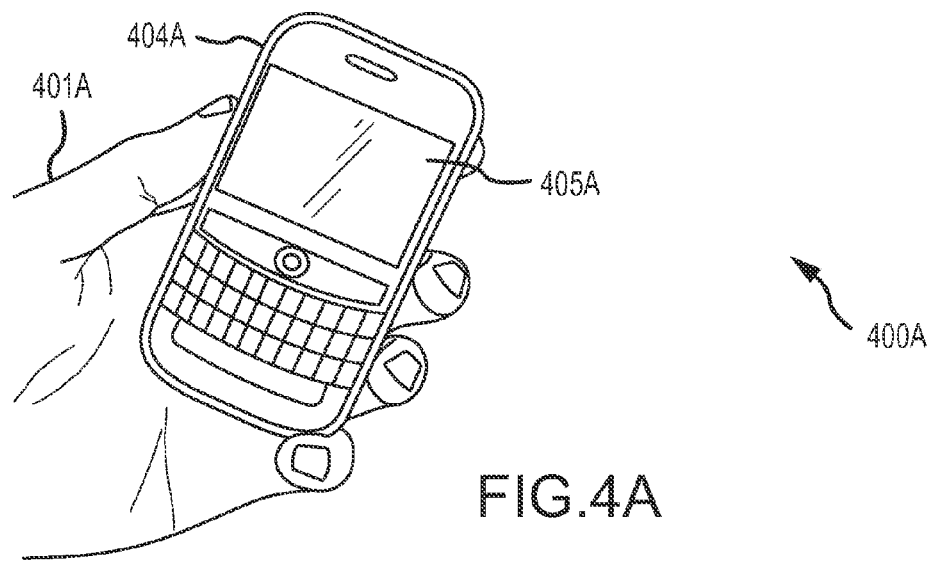
FIG.4A

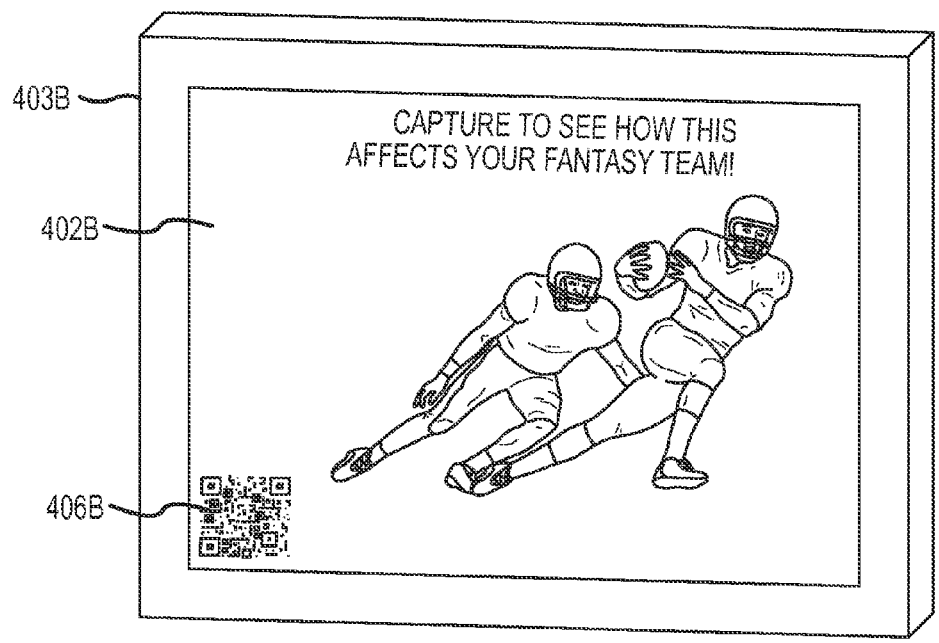
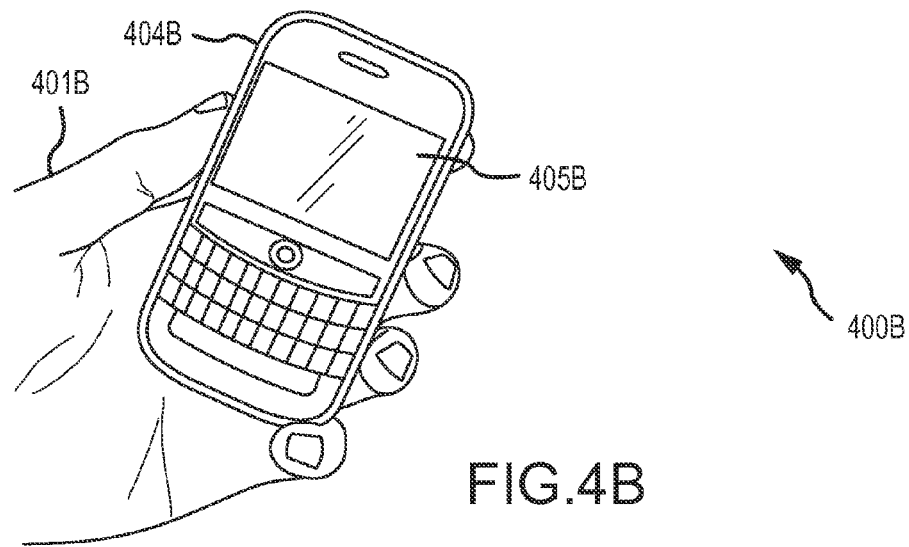
FIG.4B

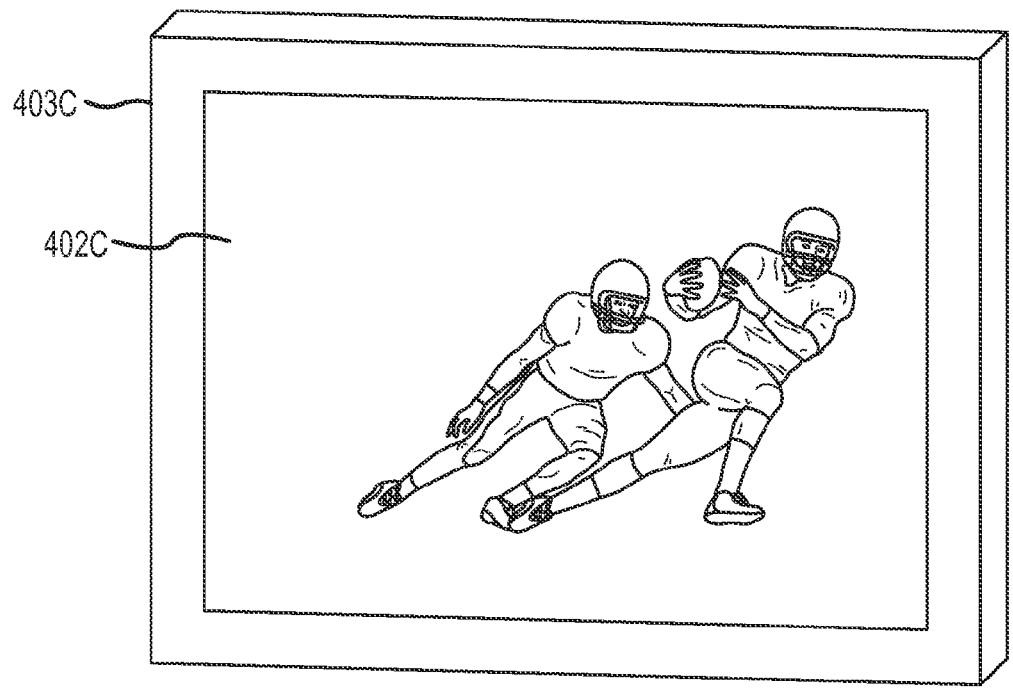
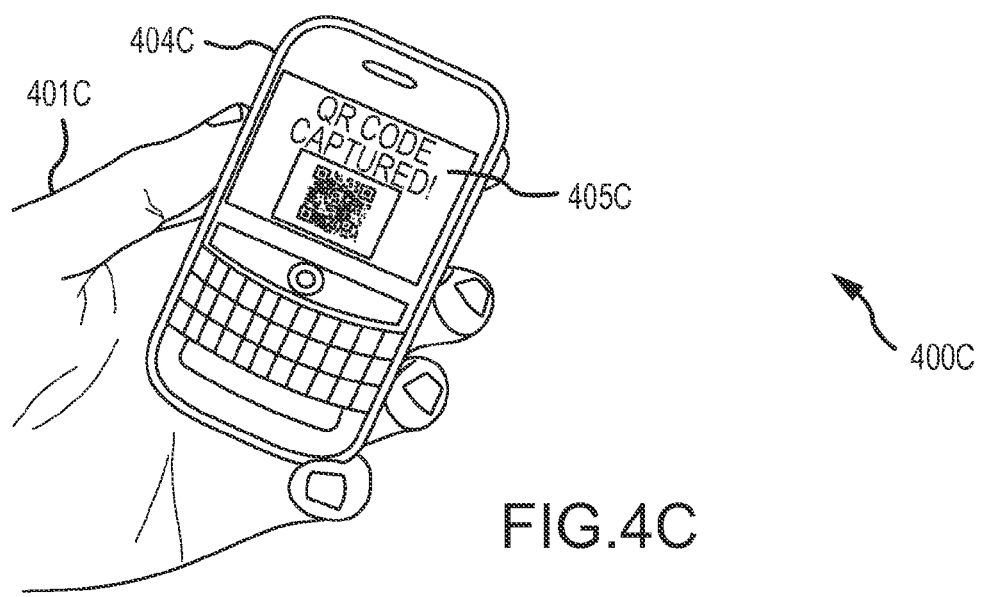
FIG.4C

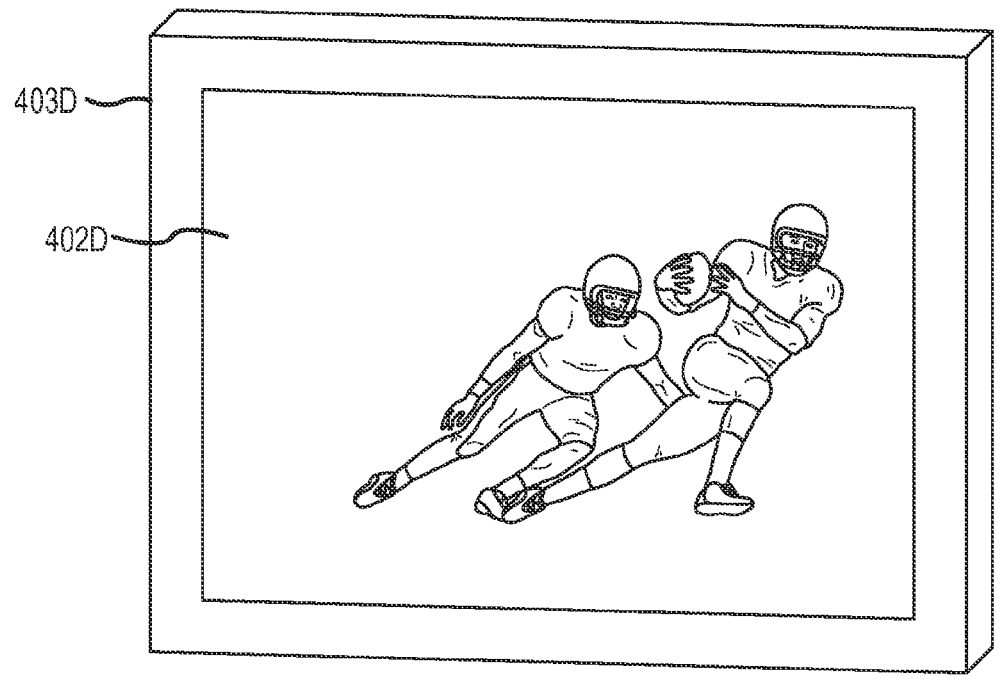
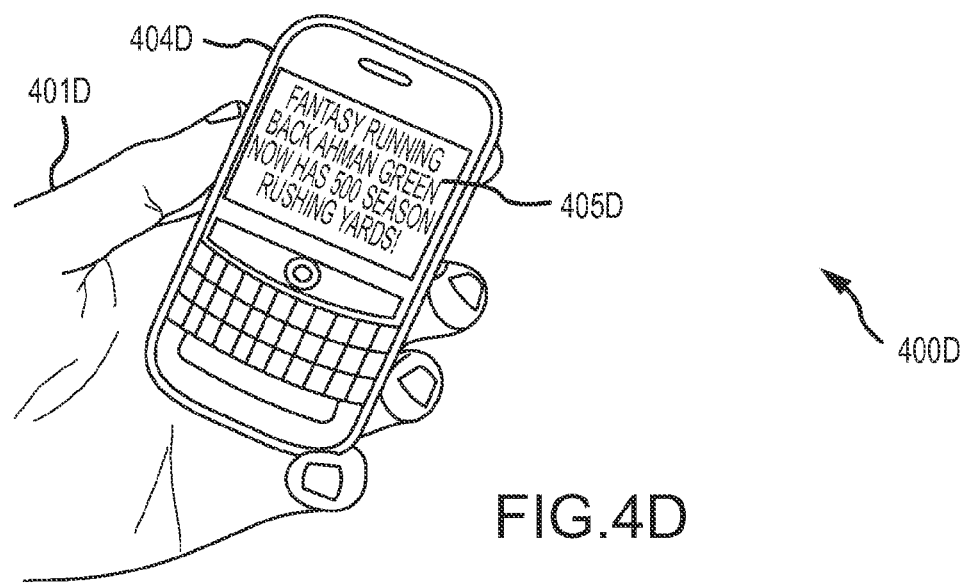
FIG.4D

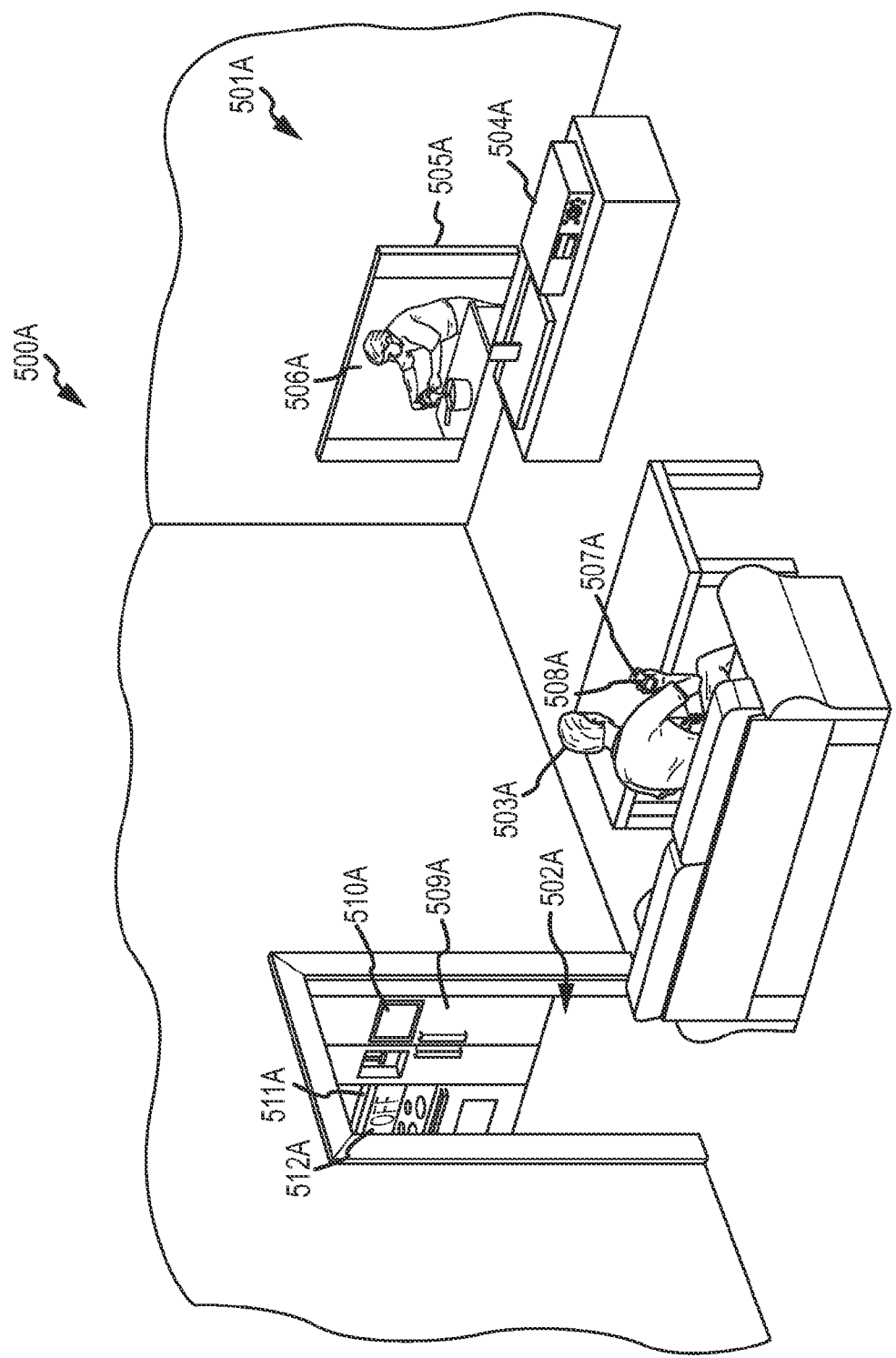

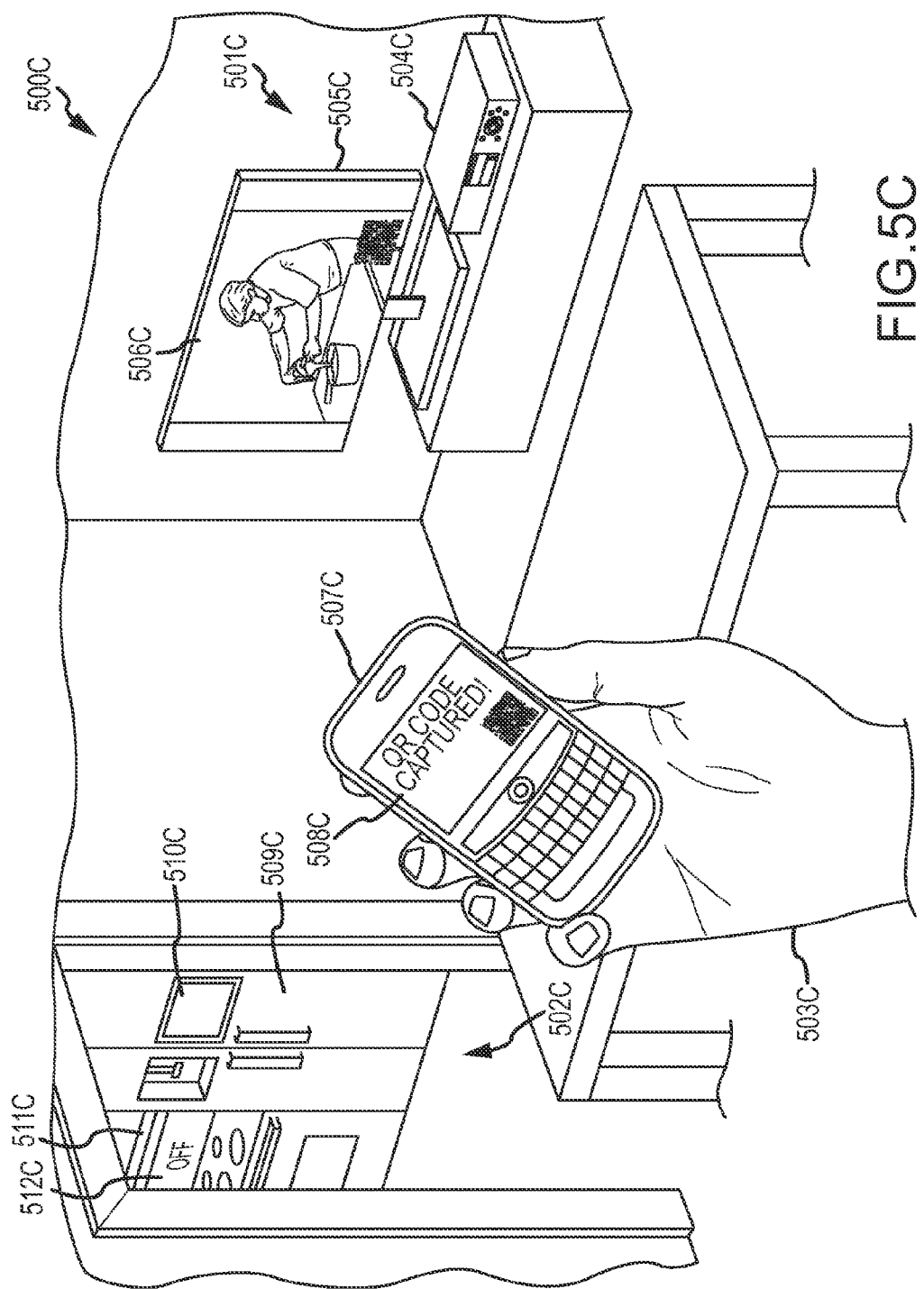

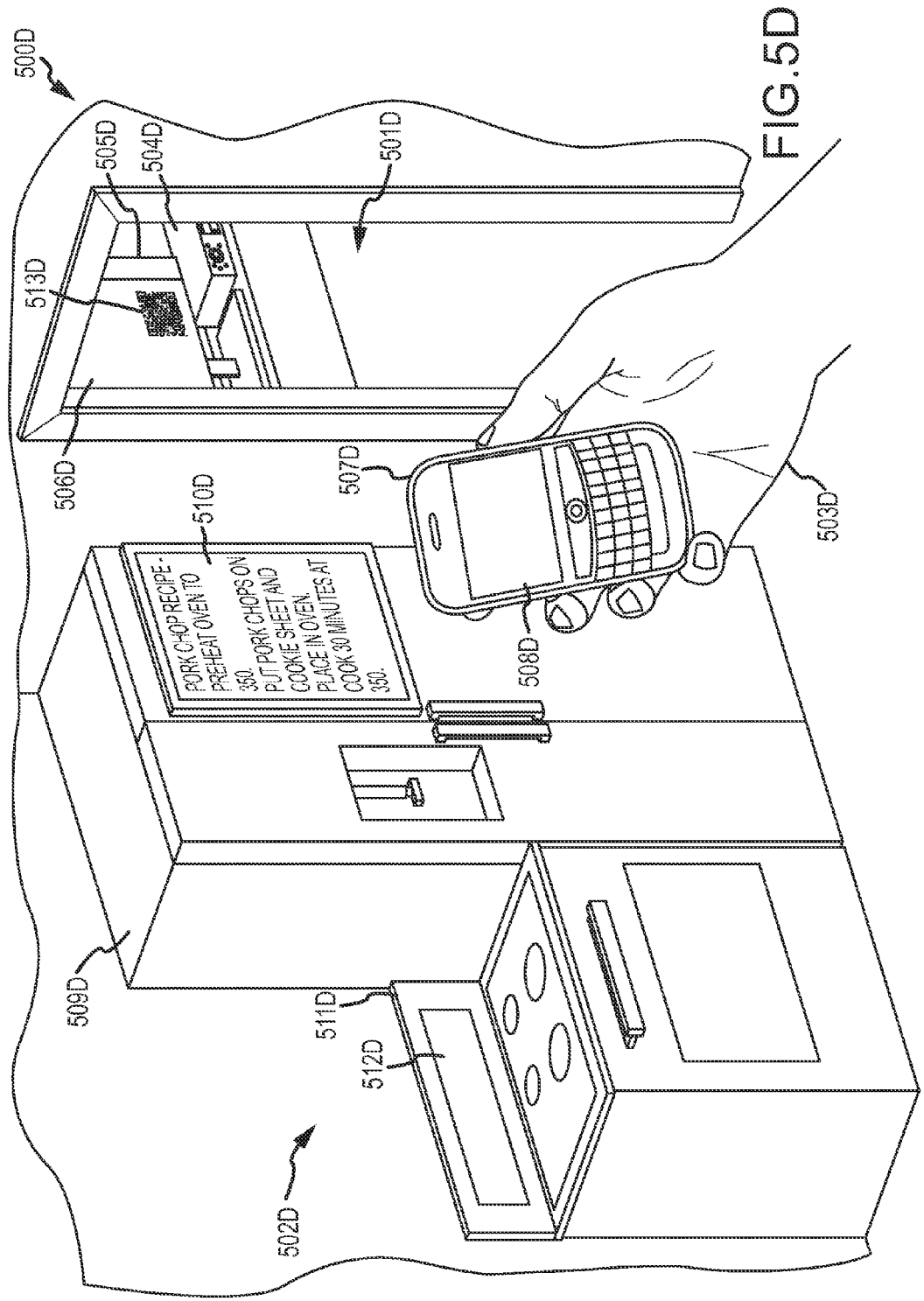

ENABLING INTERACTIVE ACTIVITIES FOR CONTENT UTILIZING MATRIX CODES

FIELD OF THE INVENTION

This disclosure relates generally to content interactive activities, and more specifically to utilizing matrix codes to enable performance of activities that are interactive with displaying content.

SUMMARY

The present disclosure discloses systems and methods for enabling interactive activities utilizing matrix codes. An electronic device, such as a content receiver, may generate one or more matrix codes (such as one or more quick response (QR) codes). The matrix codes may include information that can be utilized to perform at least one interactive activity related to one or more instances of content. The electronic device may combine the generated matrix codes with the instance of content and transmit the combination to one or more display devices. One or more matrix code readers may then capture the displayed matrix codes to initiate performance one or more interactive activities related to instances of content.

In various implementations, the instance of content may be a sporting event. In such implementations, the interactive activity may correspond to a fantasy sporting event league associated with the sporting event. As such, the interactive activity may include, but is not limited to, obtaining and/or displaying statistics related to the impact of the sporting event on a user's fantasy sporting event account, altering a configuration of a user's fantasy sporting event account based on the sporting event, and other such activities that have a correspondence between a user's participation in a fantasy sporting league and the sporting event.

In one or more implementations, performance of the at least one interactive activity related to the instance of content as initiated by the matrix code reader utilizing information decoded from the matrix code may utilize one or more electronic devices located in a user location. Initiating performance of the interactive activity may include, but is not limited to, transmitting a list of operations related to the interactive activity (such as a recipe related to a cooking show) to the electronic device. In response, the electronic device may display the list of operations, modify the list of operations based on factors of the users location, perform operations from the list of operations, instruct a user to perform operations from the list of operations, monitor the status of the interactive activity, notify a user regarding the status of the interactive activity, perform instructions provided by a user in response to notifications regarding the status of the interactive activity, and/or other actions related to the interactive activity and/or the list of operations.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

FIGS. 4A-4D are diagrams illustrating a user utilizing a first example system for enabling interactive activities. The first example system may be the system of FIG. 1.

FIGS. 5A-5J are diagrams illustrating a user utilizing a second example system for enabling interactive activities. The second example system may be the system of FIG. 1.

DETAILED DESCRIPTION OF THE EMBODIMENTS

Figure 1:
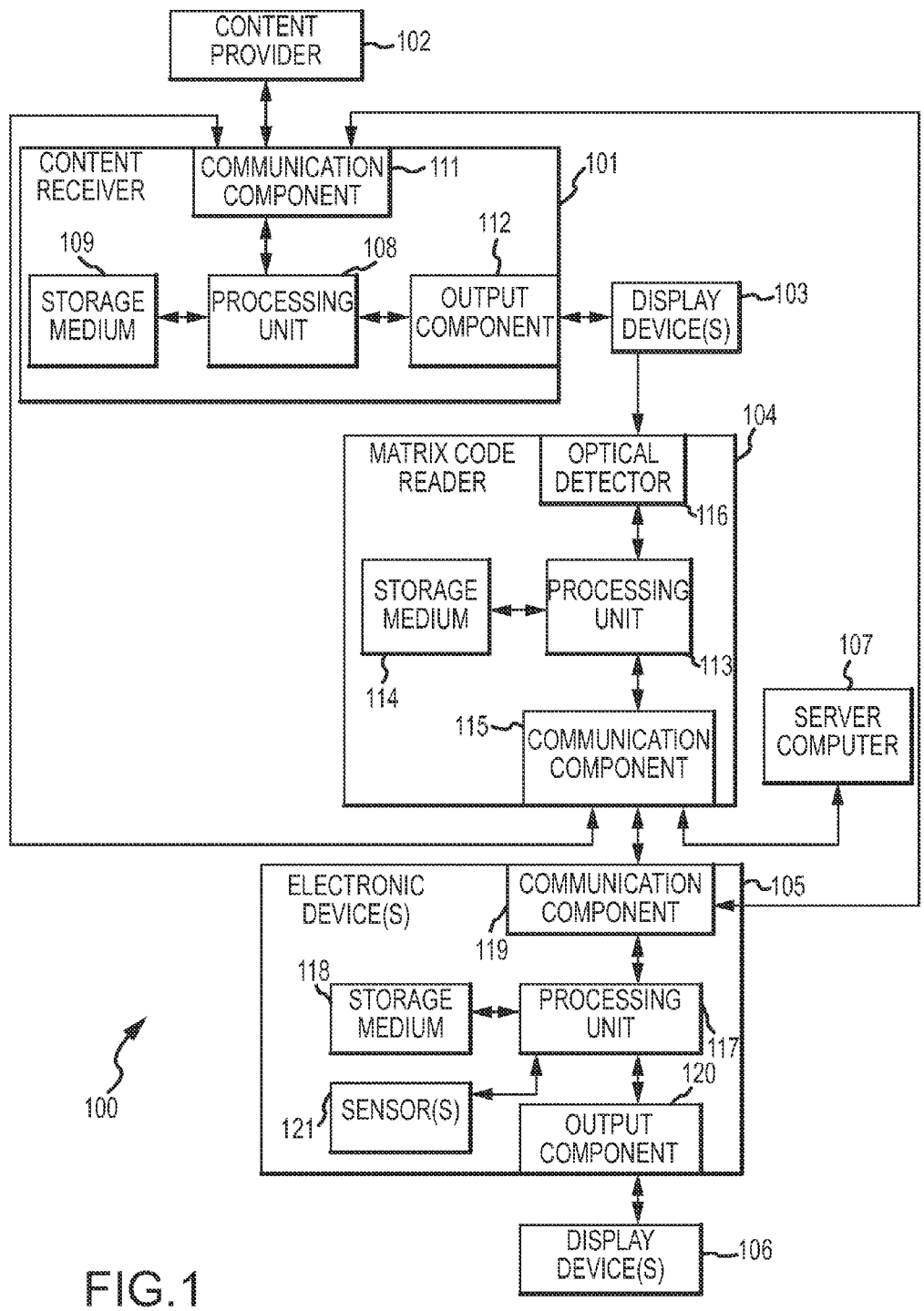
FIG. 1 is a block diagram illustrating a system for enabling interactive activities utilizing matrix codes.

The description that follows includes sample systems, methods, and computer program products that embody various elements of the present disclosure. However, it should be understood that the described disclosure may be practiced in a variety of forms in addition to those described herein.

Content receivers (such as television receivers, set top boxes, digital video recorders, digital video disk (DVD) players, personal computers, and so on) are frequently utilized by users to receive and present content from content providers (such as satellite or cable television providers, video on demand providers, pay per view programming providers, DVD retailers, and so on). Sometimes, users may be able to perform activities that are related to content that is presented by such a content receiver in order to interact with the content in various ways. By way of a first example, a user prepares food that is also being prepared on a cooking program. By way of a second example, a user may engage in a fantasy sporting event league where the user selects various players, teams, and so on of a particular sport and competes against other users based on the actual sporting performance of the selection. As users may be able to perform interactive activities related to content that they view, users may be able to make more use out of the content that they can access and may enjoy such content more than if they were not able to perform such interactive activities.

However, users viewing content may not attempt to perform such interactive activities related to their viewed content. Performance of such interactive activities may require users to stop viewing content, leave their current location, physically access other devices than the devices they are currently utilizing, and so on. Users may find the actions they are required to perform in order to perform such interactivities to be too burdensome or tedious. As such, the users may determine not to perform such interactive activities and may not experience the greater enjoyment of viewed content that may be possible through such interactive activities.

The present disclosure discloses systems and methods for enabling interactive activities utilizing matrix codes. An electronic device may generate one or more matrix codes that include information for performing one or more interactive activities related to one or more instances of content. The electronic device may combine the matrix code with the instance of content. The electronic device may also transmit the combination of the matrix code and the instance of content to one or more display devices. Subsequently, the displayed matrix code may be captured by one or more matrix code readers to initiate performance of the interactive activity. As such, one or more users may be enabled to perform the interactive activity related to the content utilizing the matrix code. In some implementations, the instance of content may be a sporting event and capture of the matrix code may initiate performance of one or more activities corresponding to a fantasy sporting event league associated with the sporting event. In various implementations, performance of the interactive activity related to the instance of content may utilize one or more other electronic devices located in a user location.

FIG. 1 is a block diagram illustrating a system 100 for enabling interactive activities utilizing matrix codes. The system 100 includes a content receiver 101, one or more content providers 102, one or more display devices 103, and at least one matrix code reader 104. The content receiver may be any kind of content receiver such as a television receiver, a set top box, a digital video recorder, a DVD player, a personal computer, and/or any other such electronic device operable to receive content from one or more providers. The content provider may be any kind of content provider such as satellite, cable, over-the-air (OTA) or internet protocol television providers, video on demand providers, pay per view programming providers, DVD retailers, and/or any other entity that provides content to one or more content receivers via one or more communication links and/or storage media distribution systems. The display device may be any kind of display device such as a cathode ray tube display, a liquid crystal display, a television, a computer monitor, and/or any other electronic device operable to display content transmitted by one or more content receivers. The matrix code reader may be any kind of matrix code reading device such as a cellular telephone, a smart phone, a mobile computer, a tablet computer, a personal digital assistant, a barcode reader and/or other electronic device operable to detect and/or capture one or more matrix codes.

The content receiver 101 may include one or more processing units 108, one or more one or more non-transitory storage media 109 (which may take the form of, but is not limited to, a magnetic storage medium; optical storage medium; magneto-optical storage medium; read only memory; random access memory; erasable programmable memory; flash memory; and so on), one or more communication components 111, and one or more output components 112. The processing unit may execute instructions stored in the non-transitory storage medium to receive one or more instances of content from the content provider 102 via the communication component, store such content in the non-transitory storage medium, and/or transmit such content to the display device 103 via the output component. Although the content receiver and display device are illustrated and described as separate components, in various implementations the content receiver and display device may be incorporated into a single component.

Content transmitted by the content receiver 101 to the display device 103 may include one or more matrix codes (such as one or more QR codes). Such matrix codes may include information that can be utilized to perform at least one interactive activity related to the content. By way of a first example, the content may include a football game and the information may be utilizable to perform one or more activities corresponding to one or more fantasy football leagues associated with the football game. By way of a second example, the content may include a cooking show and the information may be utilizable to perform actions to assist a user in preparing one or more food items discussed on the cooking show. In some implementations, the content receiver may generate one or more matrix codes and combine the matrix codes with content before transmitting the content to the display device. However, in other implementations the content received by the content receiver may include one or more matrix codes.

The matrix code reader 104 may include one or more processing units 113, one or more non-transitory storage media 114, and one or more optical detectors 116 (such as one or more still image cameras, video cameras, barcode detectors, and/or any other device operable to capture matrix codes). In some implementations, the matrix code reader may also include one or more communication components 115. The processing unit 113 may execute instructions stored in the non-transitory storage medium 114 to capture one or more matrix codes displayed by the display device 103 utilizing the optical detector 116, decode the captured matrix code (and/or utilize a backend server 107 to decode the captured matrix code), and/or initiate performance of one or more interactive activities related to content displayed by the display device utilizing information decoded from the captured matrix code.

In one or more implementations, the content may be a sporting event and the matrix code may include information that can be utilized to perform one or more activities corresponding to one or more fantasy sporting leagues associated with the sporting event. In such implementations, the content receiver 101 may store data related to a user's participation in one or more fantasy sporting leagues, analyze received content to determine that the content includes one or more sporting events related to the fantasy sporting league (such as by analyzing metadata included with and/or corresponding to the content), generate a matrix code that includes information that can be utilized to perform one or more activities associated with the user's participation in the fantasy sporting league, and transmit the matrix code as well as the content to the display device 103. The matrix code reader 104 may then capture the matrix code displayed by the display device, decode the matrix code, and initiate performance of the one or more activities associated with the user's participation in the fantasy sporting league. Such activities may include, but are not limited to, obtaining and/or displaying statistics related to the impact of the sporting event on the user's fantasy sporting event account, altering the configuration of the user's fantasy sporting event account based on the sporting event, and other such activities that have a correspondence between the user's participation in the fantasy sporting league and the sporting event. In some cases, the matrix code reader may communicate with one or more server computers 107 (which may be configured by one or more providers of the fantasy sporting league to provide one or more services related to the fantasy sporting league) via the communication component 115 in order to initiate performance of the one or more activities.

The information may include a list of operations to perform as part of performing the interactive activity. For example, the list of operations for performing an interactive activity of preparing a roast turkey as demonstrated by a cooking show may include a recipe for preparing the roast turkey. The system 100 may include one or more electronic devices 105 which may be located in the user's location (such as a home, business, or other location where a user utilizes the content receiver 101) which may be utilized to perform one of more of the operations on the list of operations and/or other actions associated with performance of the interactivity. As such, as part of initiating performance of the interactive activity, the matrix code reader 104 may transmit the information decoded from the captured matrix code and/or otherwise signal the electronic device utilizing the communication component 115.

The electronic device 105 may be any kind of electronic device such as an electronic kitchen appliance, a computing device, a telephone, a fax machine, a washing machine, and/or any other kind of electronic device that is operable to perform actions that may be utilized in performing the interactive activity. The electronic device may include one or more processing units 117 and one or more non-transitory storage media 118. In some instances, the electronic device may also include one or more sensors 121 and/or one or more output components 120 operable to transmit output to one or more display devices 106 (which may or may not be incorporated into the electronic device). The sensor may be any kind of sensor such as a temperature sensor, a camera, a user input detector, and/or any other sensor operable to detect the status of the electronic device and/or operations performed by and/or utilizing the electronic device. The electronic device may receive the information decoded from the captured matrix code and/or other signal from the matrix code reader 104 via the communication component 105 and in response the processing unit 117 may execute one or more instructions stored in the non-transitory storage medium 118 to perform one or more actions related to performance of the interactive activity.

In some cases, in response to receiving the list of operations associated with performance of the interactive activity, the electronic device 105 may analyze the list of operations, determine to alter at least a portion of the list of operations based on one or more location factors associated with the user's location, and alter the list of operations accordingly. For example, the list of operations may include a recipe for baking a cake that is being shown on a food program. In this example, the recipe may be designed to be performed at sea level. However, the user's location may be at an elevation significantly different than sea level (such as five thousand feet above sea level, ten thousand feet above sea level, and so on) and therefore cooking times and/or other aspects of the recipe may need to be altered. Further in this example, the sensor 121 may be an altitude sensor. The electronic device 105 may receive the recipe for baking the cake, determine from the sensor that the user's location is not at sea level, and alter the recipe accordingly.

In some instances, in response to receiving the list of operations associated with performance of the interactive activity, the electronic device 105 may display at least a portion of the list of operations on the display device 106. For example, the electronic device may be a refrigerator with an incorporated television and the list of operations may include dietary suggestions related to a health program. As such, when the refrigerator receives the list of dietary suggestions, the refrigerator may display the list of dietary suggestions on the incorporated television so that the user can review the list when opening the refrigerator to obtain a snack.

The electronic device 105 may perform one or more operations from the list in response to receiving the list of operations in one or more implementations. For example, if the list of operations includes a recipe for baking a casserole and the electronic device is an oven, the oven may preheat to a temperature specified in the list of operations in response to receiving the list. Further, the electronic device may provide one or more instructions to the user (such by transmitting the one or more instructions to the matrix code reader 104 via the communication component 119) in response to receiving the list. In the above example where the list of operations includes baking a casserole and the electronic device is an oven that preheats to a specified temperature, the oven may transmit a message to the user instructing the user to perform an operation of the recipe (such as coating a casserole dish with butter in preparation for putting casserole ingredients in the casserole dish) while the oven is preheating. Moreover, the electronic device may provide such user instructions after completing one or more operations from the list such as the oven in the above example transmitting instructions to the user to place the casserole in the oven after the oven has finished preheating.

By way of another example, the electronic device 105 may be a refrigerator with an associated display device and the list of operations may include a recipe for baking lasagna. The refrigerator may track an inventory of food products stored within the refrigerator and may analyze the list of operations to determine ingredients necessary to perform the recipe, and may display a shopping list for recipe ingredients not currently in the refrigerator's inventory and/or transmit such a shopping list to one of the user's device (such as to the matrix code reader 104, the display device 103 or another device via the communication component 119).

Additionally, during performance of one or more actions related to the interactive activity in response to the signal, information decoded from the captured barcode, and/or list of operations received from the matrix code reader 104, the electronic device 105 may utilize the sensor 121 to monitor the status of the one or more actions and/or report such status to the user (such as by transmitting the status to the matrix code reader via the communication component 119). For example, in an implementation where the electronic device 105 is an oven and the list of operations includes a recipe for cooking a turkey, the oven may utilize one or more sensors 121 to monitor the cooking of the turkey. In some implementations, such sensors may include one or more cameras (and/or other temperature sensors such as laser temperature sensors) and the processing unit 117 may analyze one or more pictures taken by such cameras (and/or other temperature related data captured by other such temperature sensors) to determine whether or not the turkey is fully cooked. If the processing unit 117 determines that the turkey is fully cooked, the oven may transmit a message (such as to the matrix code reader 104 and/or the display device 103 via the communication component 119) notifying the user that the cooking is finished. The oven may also be operable in such cases to turn off and stop the cooking of the turkey or other such operations based on a message received from the user (such as from the matrix code reader via the communication component) submitted by the user in response to receiving the notification. In other such implementations, the oven may transmit one or more pictures captured by the camera to the user without analyzing the pictures to determine whether or not the turkey is cooked and may act on user instructions submitted in response to the transmitted pictures.

Figure 2:
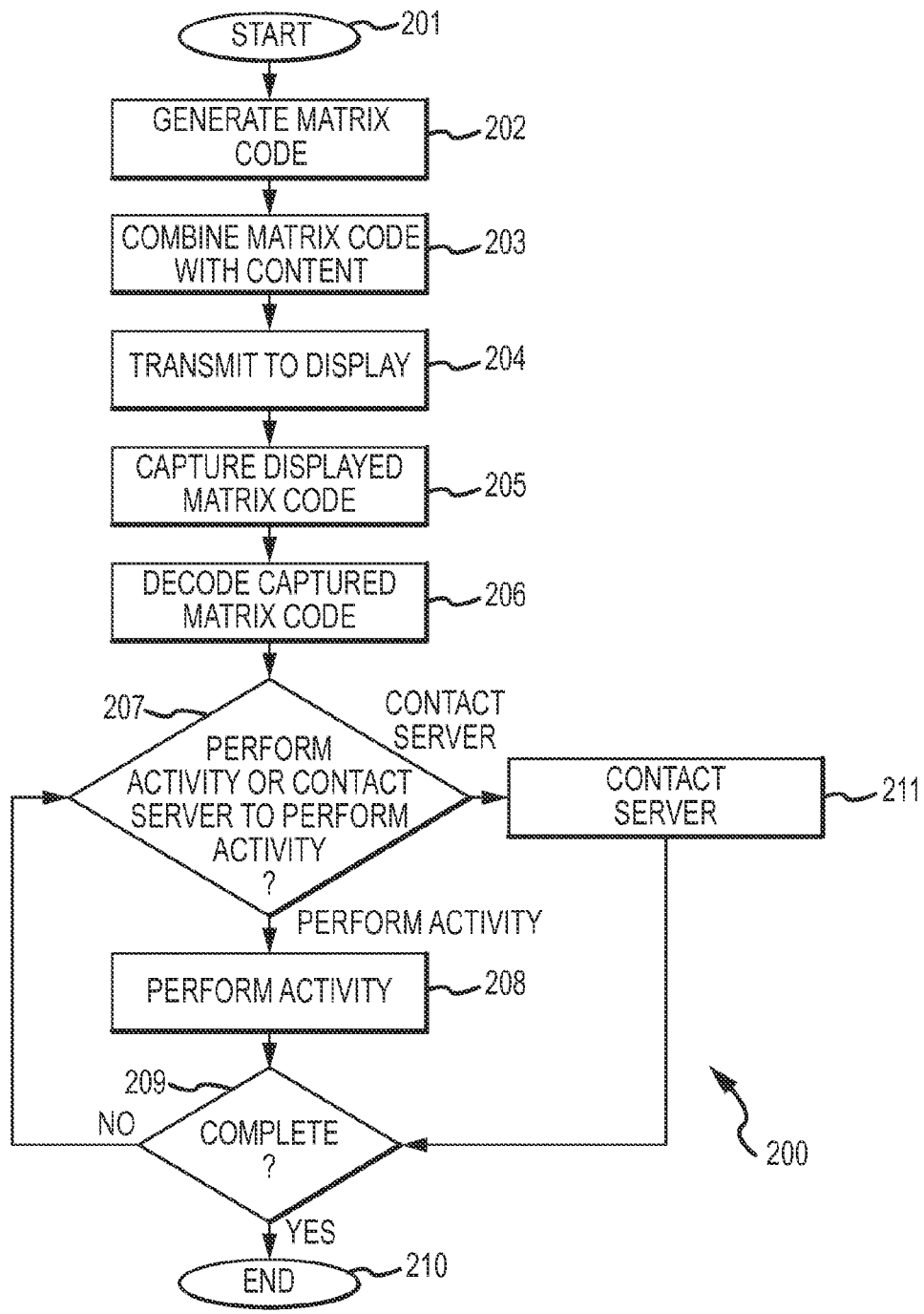
FIG. 2 is a flow chart illustrating a first example method for enabling interactive activities utilizing matrix codes. This method may be performed by the system of FIG. 1.

FIG. 2 illustrates a first example method 200 for enabling interactive activities utilizing matrix codes. The method 200 may be performed by the system 100 of FIG. 1. The flow begins at block 201 and proceeds to block 202 where the content receiver 101 generates a matrix code (such as a QR code) that includes information that can be utilized to perform an interactive activity corresponding to a fantasy sporting league. The flow then proceeds to block 203 where the content receiver combines the matrix code with content that includes a sporting event related to the fantasy sporting league. Next, the flow proceeds to block 204 where the content receiver transmits the combined content and matrix code to the display device 103 before the flow proceeds to block 205.

At block 205, the matrix code reader 104 captures the matrix code displayed by the display device 103. Then the flow proceeds to block 206 where the matrix code reader decodes the matrix code before the flow proceeds to block 207. At block 207, the matrix code reader determines whether the matrix code reader will perform the interactive activity corresponding to the fantasy sporting league or whether the matrix code reader will contact the server computer 107 in order to perform the interactive activity. If the matrix code reader determines to perform the interactive activity, the flow proceeds to block 208 where the matrix code reader performs the interactive activity before the flow proceeds to block 209. Otherwise, the flow proceeds to block 211 where the matrix code reader contacts the server computer before the flow proceeds to block 209.

At block 209, the matrix code reader 104 determines whether or not the interactive activity has been completed. If so, the flow proceeds to block 210 and ends. Otherwise, the flow returns to block 207 where the matrix code reader determines whether the matrix code reader will perform additional actions related to the interactive activity corresponding to the fantasy sporting league or whether the matrix code reader will contact the server computer 107 in order to perform the additional actions.

Although the first example method 200 illustrates and described the content receiver 101 as generating the matrix code and combining the matrix code with content, other contemplated arrangements are possible. For example, in other implementations the content provider 102 may generate the matrix code and/or combine the matrix code with the content without departing from the scope of the present disclosure.

Figure 3:
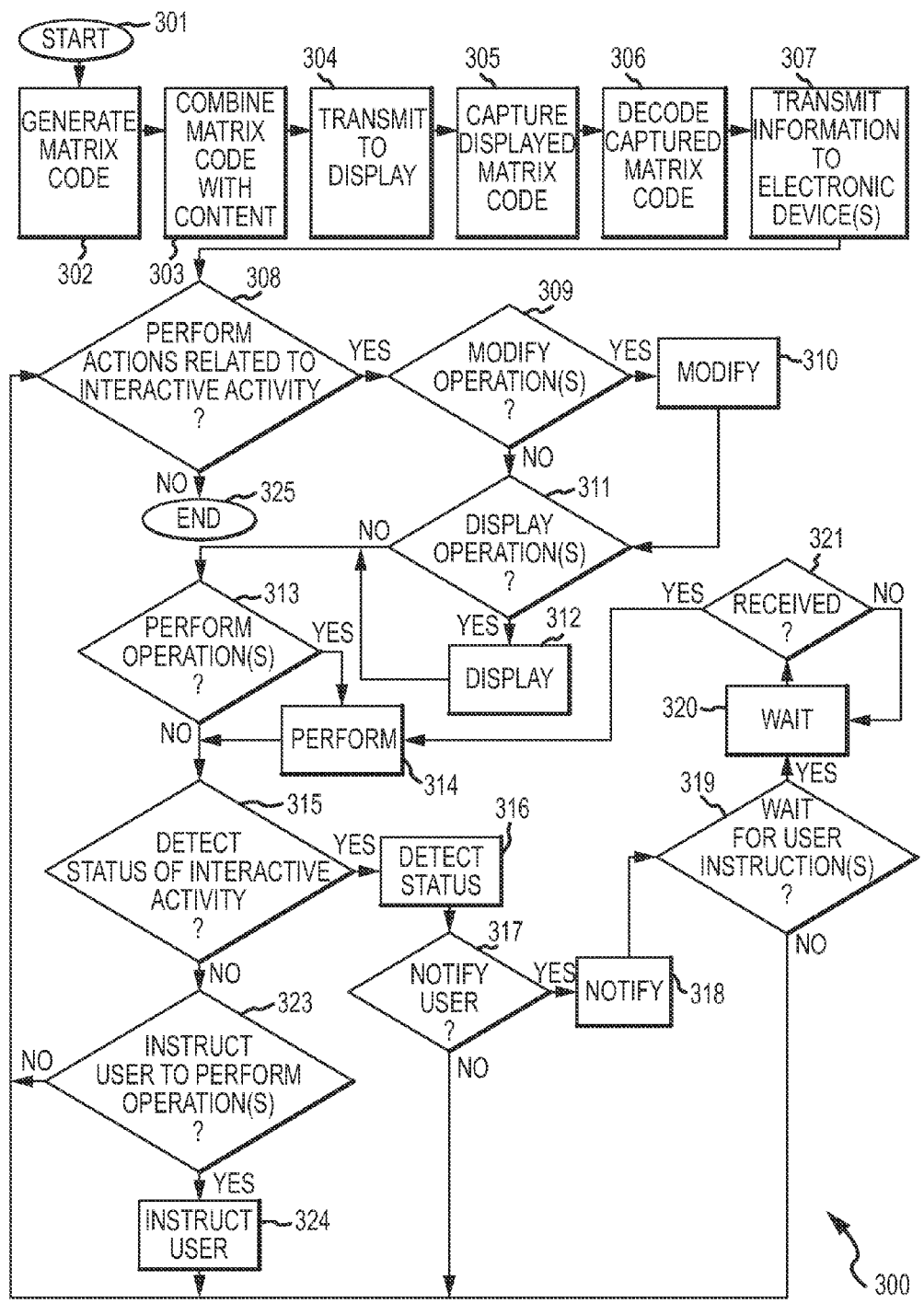
FIG. 3 is a flow chart illustrating a second example method for enabling interactive activities utilizing matrix codes. This method may be performed by the system of FIG. 1.

FIG. 3 illustrates a second example method 300 for enabling interactive activities utilizing matrix codes. The method 300 may be performed by the system 100 of FIG. 1. The flow begins at block 301 and proceeds to block 302 where the content receiver 101 generates a matrix code (such as a QR code) that includes information that can be utilized to perform an interactive activity utilizing the electronic device 105. The flow then proceeds to block 303 where the content receiver combines the matrix code with content related to the interactive activity. Next, the flow proceeds to block 304 where the content receiver transmits the combined content and matrix code to the display device 103 before the flow proceeds to block 305.

At block 305, the matrix code reader 104 captures the matrix code displayed by the display device 103. Then the flow proceeds to block 306 where the matrix code reader decodes the matrix code before the flow proceeds to block 307. At block 307, the matrix code reader transmits the information decoded from the matrix code to the electronic device 105 before the flow proceeds to block 308.

At block 308, the electronic device 105 determines whether or not to perform one or more actions related to the interactive activity. If no, the flow proceeds to block 325 and ends. Otherwise, the flow proceeds to block 309 where the electronic device determines whether or not to modify one or more operations in a list of operations included in the information. If so, the flow proceeds to block 310 where the electronic device modifies such operations before the flow proceeds to block 311. Otherwise, the flow proceeds directly to block 311.

At block 311, the electronic device 105 determines whether or not to display one or more portions of the list of operations. If so, the flow proceeds to block 312 where the electronic device transmits the one or more portions of the list of operations to the display device 106 before the flow proceeds to block 313. Otherwise, the flow proceeds directly to block 313.

At block 313, the electronic device 105 determines whether or not to perform one or more of the operations from the list of operations. If so, the flow proceeds to block 314 where the electronic device performs the one or more operations before the flow proceeds to block 315. Otherwise, the flow proceeds directly to block 315.

At block 315, the electronic device 105 determines whether or not to detect a status of the interactive activity utilizing the one or more sensors 121. If so, the flow proceeds to block 316 where the electronic device utilizes the one or more sensors to detect the status of the interactive activity before the flow proceeds to block 317. Otherwise, the flow proceeds to block 323.

At block 323, the electronic device 105 determines whether or not to instruct a user to perform one or more operations from the list of operations. If so, the flow proceeds to block 324 where the electronic device transmits such instructions to the user (such as to the matrix code reader 104 and/or the display device 103 via the communication component 119) before the flow returns to block 308 and the electronic device determines whether or not to perform one or more actions related to the interactive activity. Otherwise, the flow returns directly to block 308 and the electronic device determines whether or not to perform one or more actions related to the interactive activity.

At block 317, after the electronic device 105 detects the status of the interactive activity, the electronic device determines whether or not to notify the user regarding the status of the interactive activity. If not, the flow returns to block 308 and the electronic device determines whether or not to perform one or more actions related to the interactive activity. Otherwise, the flow proceeds to block 318 where the electronic device transmits a notification regarding the status of the interactivity to the user (such as to the matrix code reader 104 and/or the display device 103 via the communication component 119) before the flow proceeds to block 319.

At block 319, after transmitting the status of the interactive activity to the user, the electronic device 105 determines whether or not to wait for the user to provide one or more instructions in response to the notification. If not, the flow returns to block 308 and the electronic device determines whether or not to perform one or more actions related to the interactive activity. Otherwise, the flow proceeds to block 320 where the electronic device waits to receive the one or more user instructions before the flow proceeds to block 321.

At block 321, after the electronic device 105 determines to wait to receive one or more user instructions in response to the notification, the electronic device determines whether or not the one or more user instructions have been received. If so, the flow proceeds to block 314 where the electronic device performs the one or more user instructions. Otherwise, the flow returns directly to block 308 and the electronic device determines whether or not to perform one or more actions related to the interactive activity.

Although the second example method 300 illustrates and described the content receiver 101 as generating the matrix code and combining the matrix code with content, other contemplated arrangements are possible. For example, in other implementations the content provider 102 may generate the matrix code and/or combine the matrix code with the content without departing from the scope of the present disclosure. Further, although the method 300 is illustrated and described as performing the operations of blocks 308-314 and performing such operations in a particular order, in other contemplated arrangements various combinations of one or more of the operations of blocks 308-324 may be performed in various orders without departing from the scope of the present disclosure.

Returning to FIG. 1, although the matrix code reader 104 is illustrated and described as signaling and/or transmitting the information decoded from the captured matrix code to the electronic device 105 via the communication components 115 and 119, other contemplated arrangements are possible.

For example, in some implementations the matrix code reader may include one or more associated display devices (not shown), which may or may not be integrated with the matrix code reader, and the electronic device may include one or more optical detectors (not shown). As such, in response to capturing a matrix code, the matrix code reader may itself display a matrix code (which may be the captured matrix code, a matrix code generated by the matrix code reader in response to decoding the captured matrix code, and/or other such matrix code) on the display device associated with the matrix code reader and the electronic device may utilize the optical detector of the electronic device to capture the matrix code displayed by the matrix code reader.

FIGS. 4A-4D illustrate a user 401A-401D utilizing a first example system 400A-400D for enabling interactive activities. The first example system 400A-400D may be the system of FIG. 1. As illustrated in FIG. 4A, the user 401A may be watching a football game that is displayed on a television screen 402A of a television 403A. While displaying the football game, the television may generate a QR code that includes information that the user can utilize to obtain statistics affected by the football game about a player in their fantasy football league who is playing in the football game.

As illustrated in FIG. 4B, after the television 404B generates the QR code 406B, the television may combine the QR code with the football game and display the combination on the screen 402B. Subsequently, the user 401B may utilize a cellular telephone 404B to capture the QR code 406B. When the user captures the QR code utilizing the cellular telephone, as illustrated in FIG. 4C, the cellular telephone 404C may display an indication on a screen 405C of the cellular telephone that the QR code 406C was captured.

Then, as illustrated in FIG. 4D, in response to capturing the QR code 406D, the cellular telephone 404D may utilize information decoded from the QR code obtain the statistics affected by the football game about the player in the user's fantasy football league who is playing in the football game and present such statistics on the screen 405D.

Figure 5B:
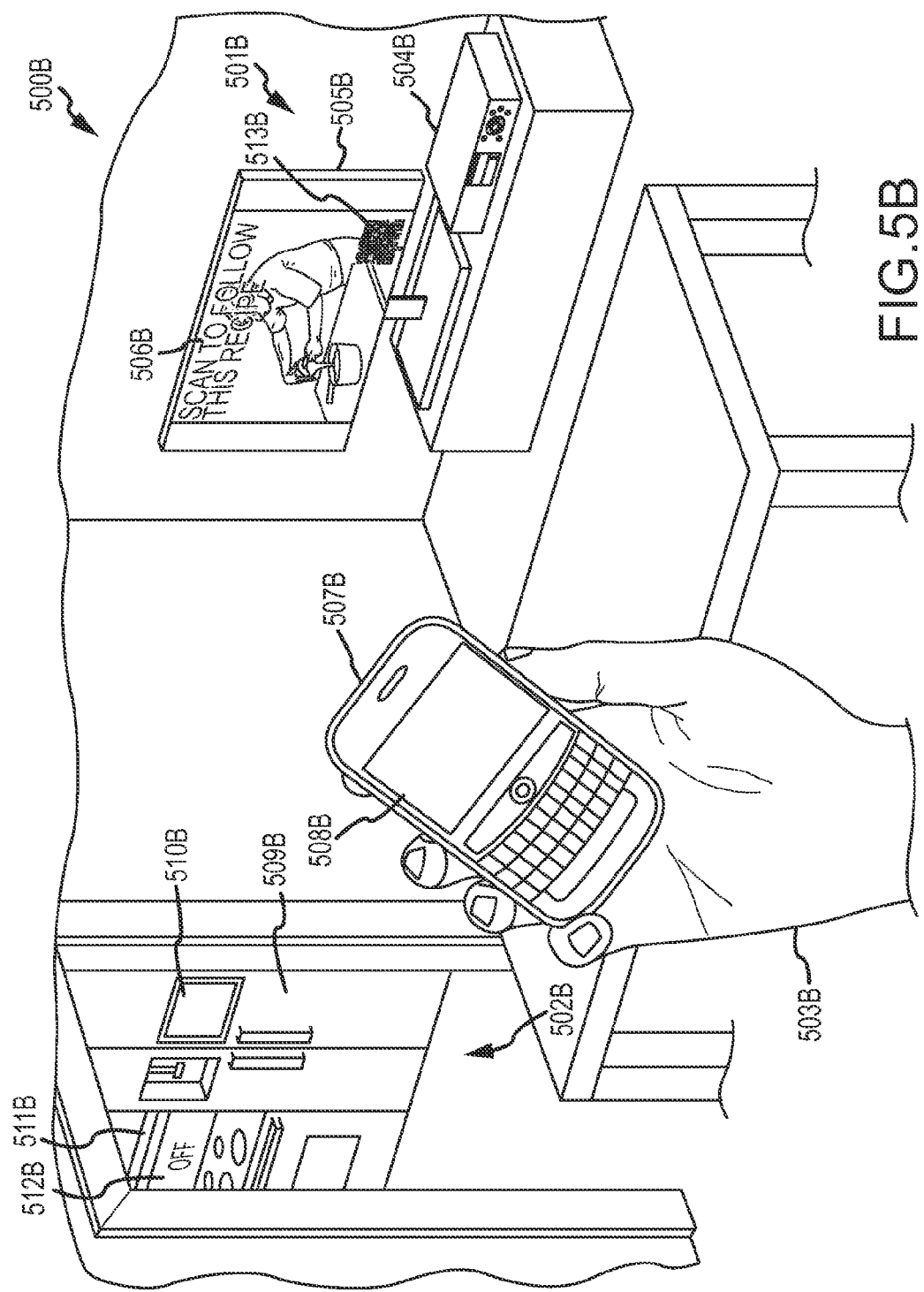

FIGS. 5A-5J illustrate a user 503A-503J utilizing a second example system 500A-500J for enabling interactive activities. The first example system 500A-500J may be the system of FIG. 1. As illustrated in FIG. 5A, the user 503A may be watching a cooking show on a television screen 506A of a television 505A that is connected to a set top box 504A in the user's living room 501A. As illustrated in FIG. 5B, while the television 505B is displaying the cooking show, the television may display a QR code 513B that has been combined with the displayed cooking show and can be captured by the user 503B in order to perform a recipe for cooking pork chops along with the cooking show. As illustrated in FIG. 5C, the user 503C may utilize a smart phone 507C to capture the QR code, which may display a message on a smart phone screen 508C indicating that the QR code 513C has been captured.

Figure 5E:
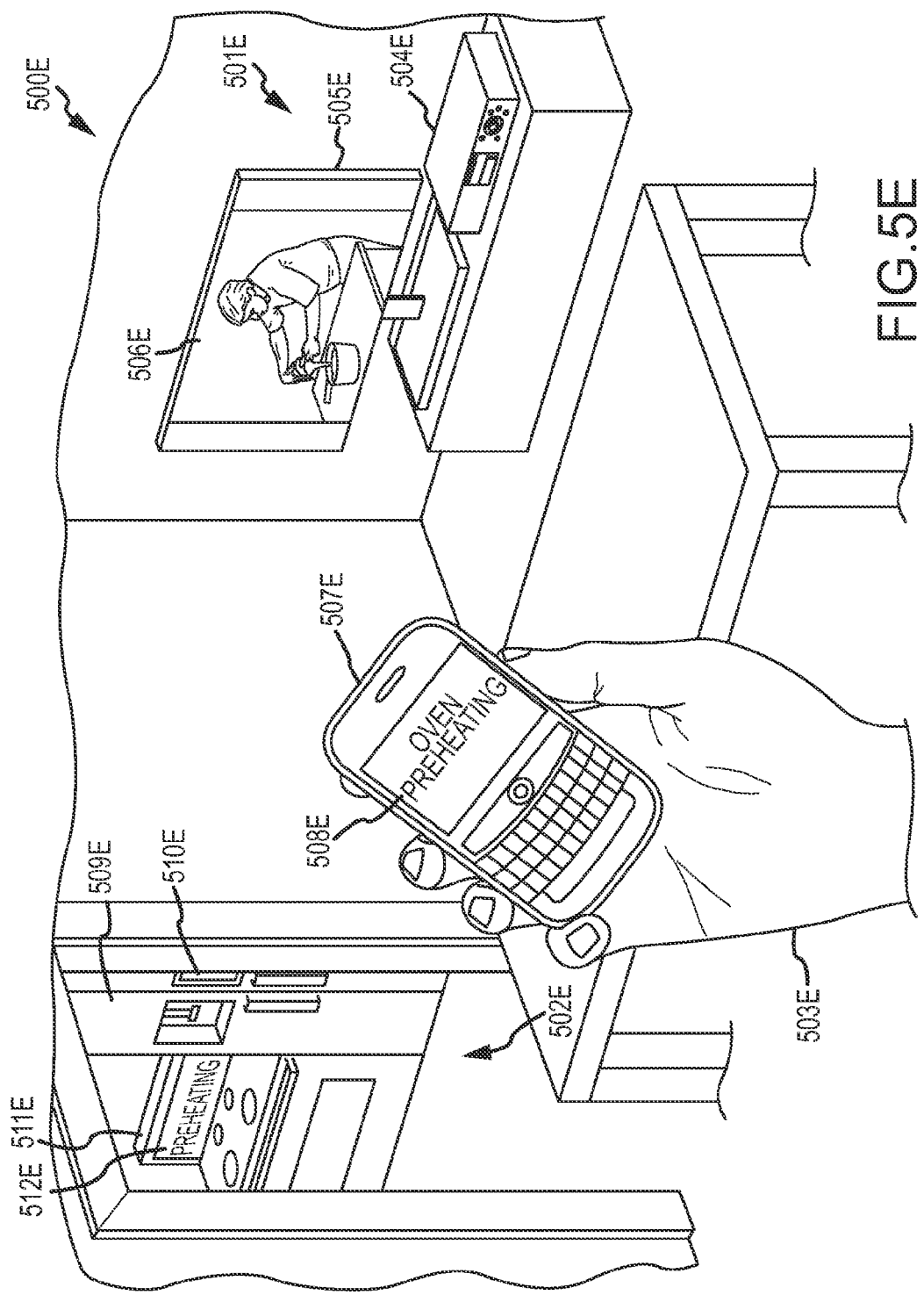

As illustrated in FIG. 5D, in response to capturing the QR code 513D, the smart phone 507D may transmit a recipe for cooking pork chops decoded from the QR code to a refrigerator 509D in the user's 503D kitchen 502D. The refrigerator may display the received recipe for cooking pork chops on a refrigerator screen 510D. As such, the user may be able to utilize the refrigerator screen to view the recipe while in the kitchen. Further, in response to capturing the QR code, the smart phone may also transmit the recipe to oven 511D in the user's kitchen. As illustrated in FIG. 5E, in response to receiving the recipe, the oven 511E may perform the first operation of the recipe by beginning to preheat itself to three-hundred and fifty degrees and may display such on an oven display 512E. In at least one embodiment, the smart phone 507E may prompt the user regarding whether to preheat the oven and may the initiate transmission of a command to the over to begin the preheating process. The oven may also respond to the smart phone 507E to confirm that the oven is preheating and the smart phone may display such a confirmation on the smart phone screen 508E.

Figure 5F:
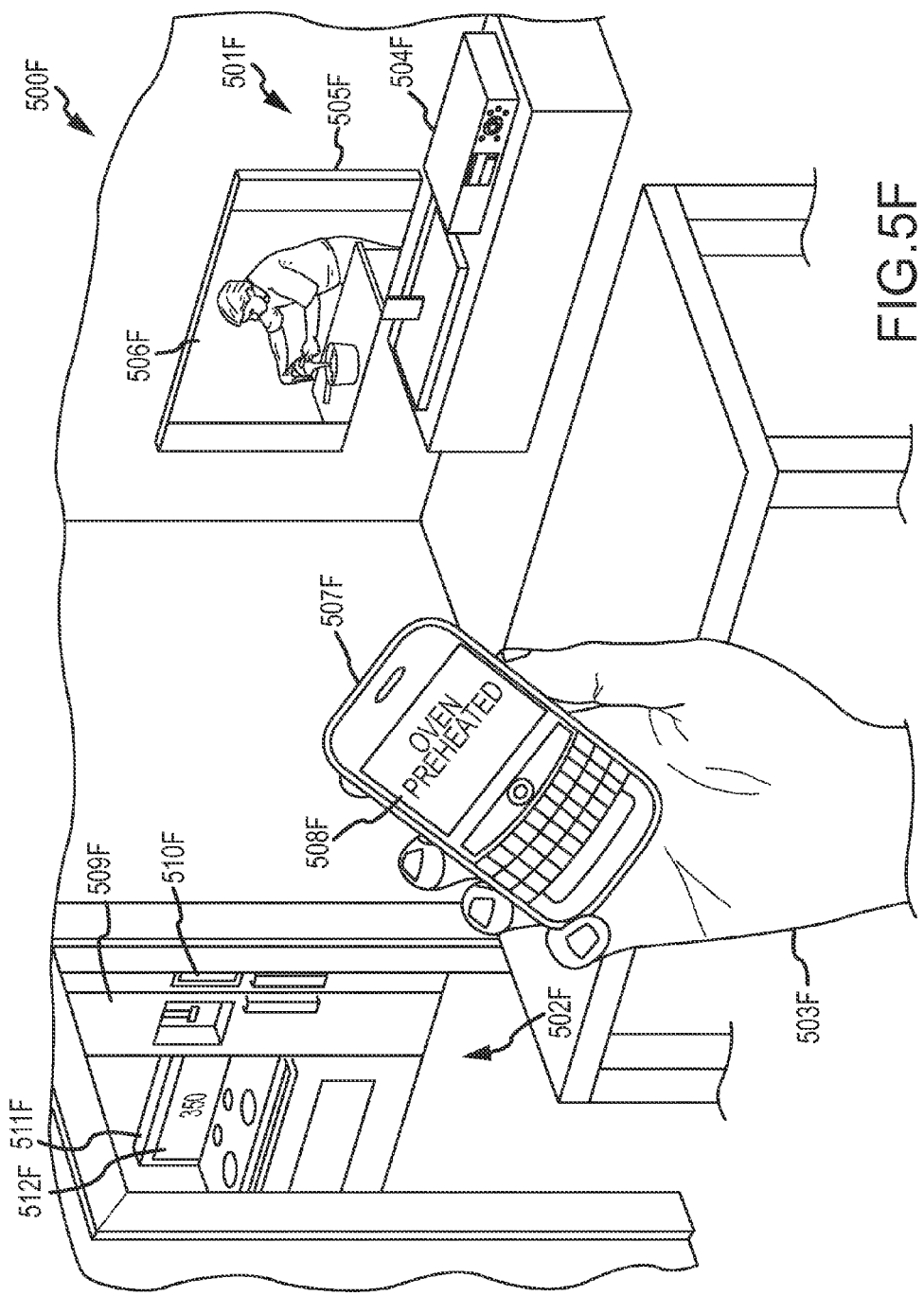

While preheating itself to three-hundred and fifty degrees, the oven 511E may monitor the status of the preheating. As illustrated in FIG. 5F, when preheating is finished and the oven 511F has reached three-hundred and fifty degrees, as illustrated on the oven display 512F, the oven may transmit a message to the smart phone 507F that preheating is finished. The smart phone may display the message on the smart phone screen 508F.

Figure 5G:
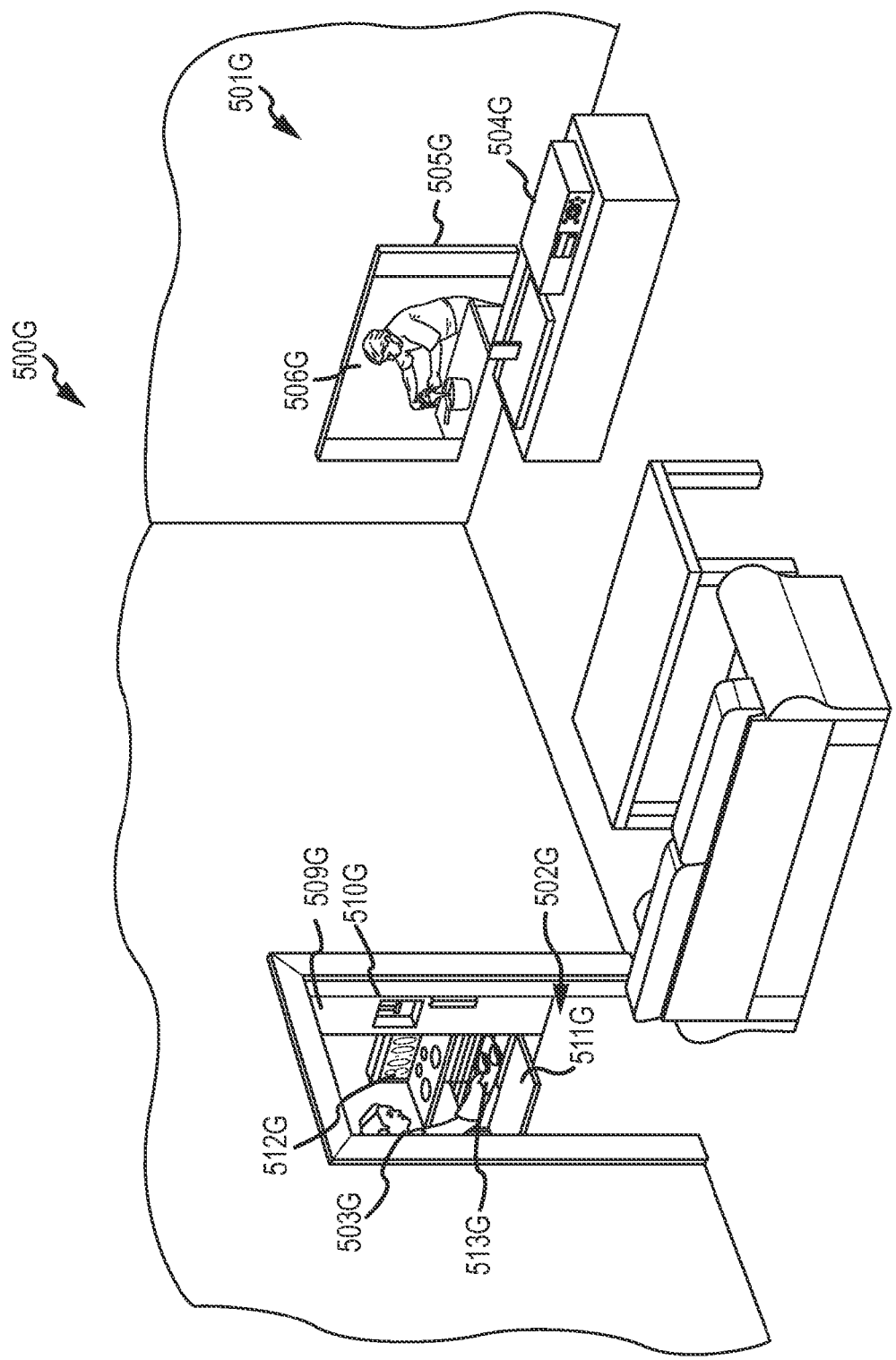

As illustrated in FIG. 5G, after being notified that the oven has preheated, the user 503G may go to the kitchen 502G and follow the next step in the recipe displayed on the refrigerator screen 510G by putting a cookie sheet of pork chops 513G into the oven 511G and providing input to the oven to begin cooking.

Figure 5H:
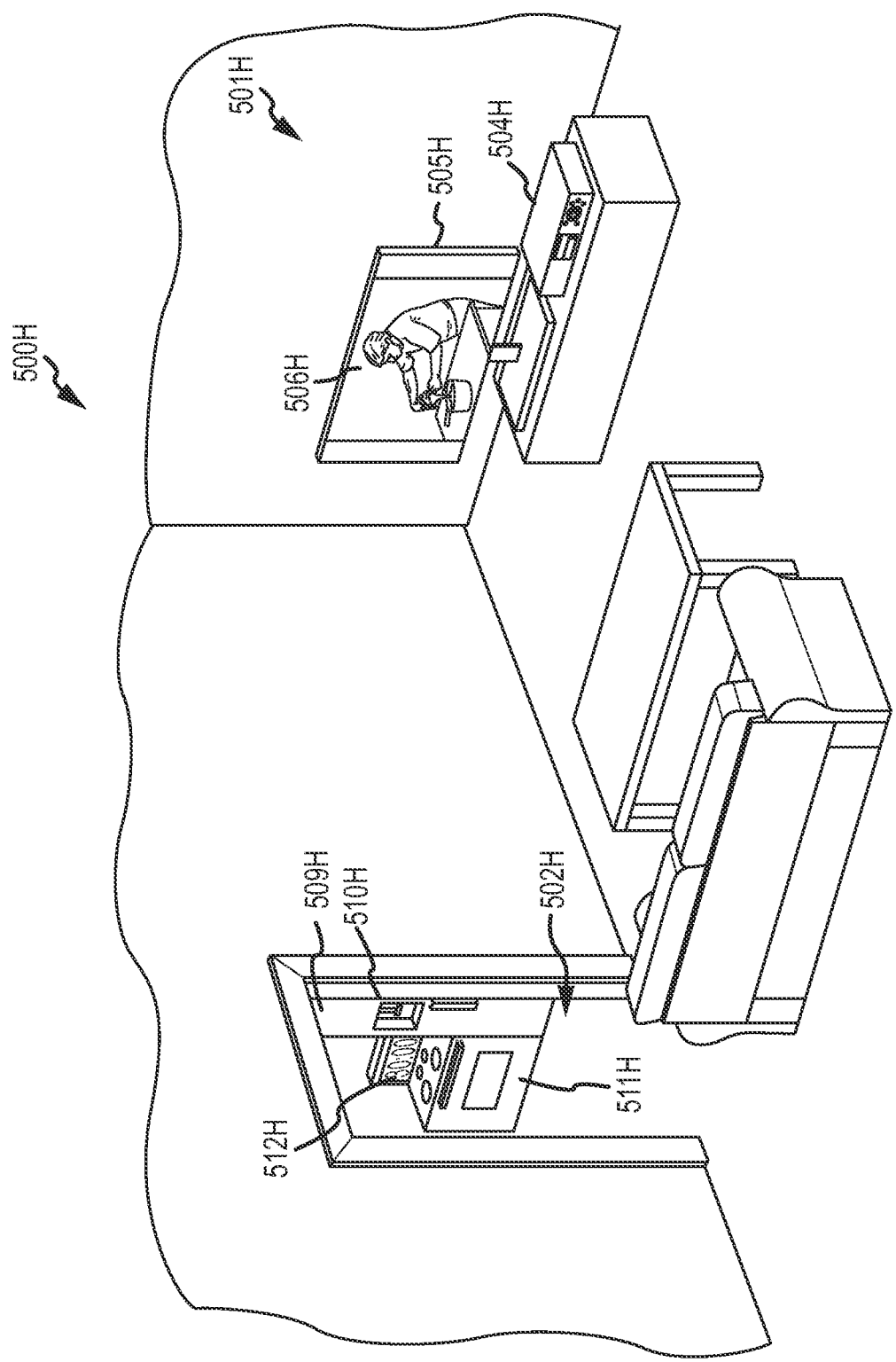
Figure 51:
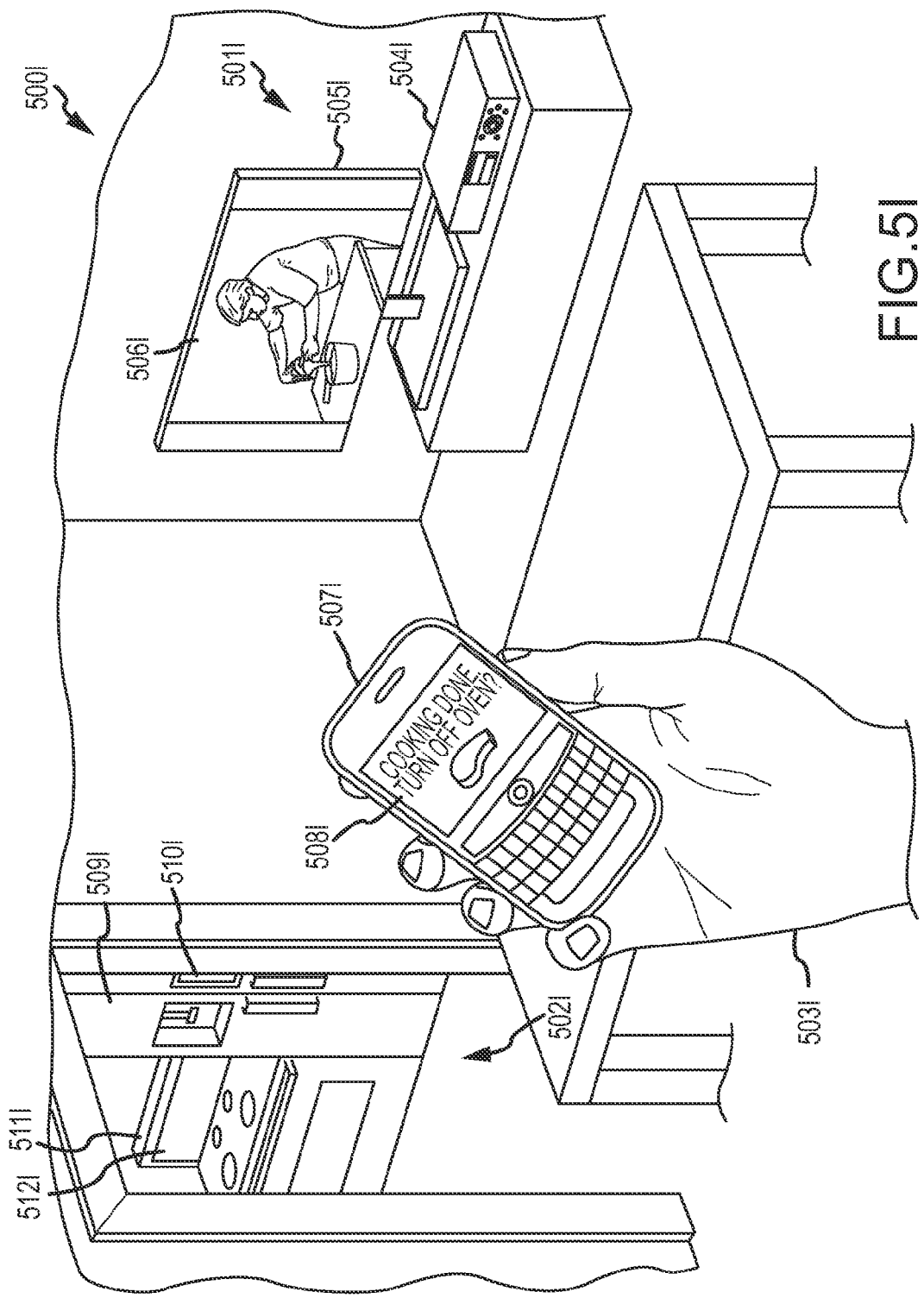

After receiving input from the user to begin cooking, the oven 513G may evaluate whether the cooking time indicated in the recipe needs to be adjusted for altitude. In this example, as illustrated in FIG. 5H, the oven 511H determines that the recipe is designed for the same elevation as the user and does not require adjustment and the oven sets itself to cook for thirty minutes, displaying such on the oven display 512H.

Figure 5J:
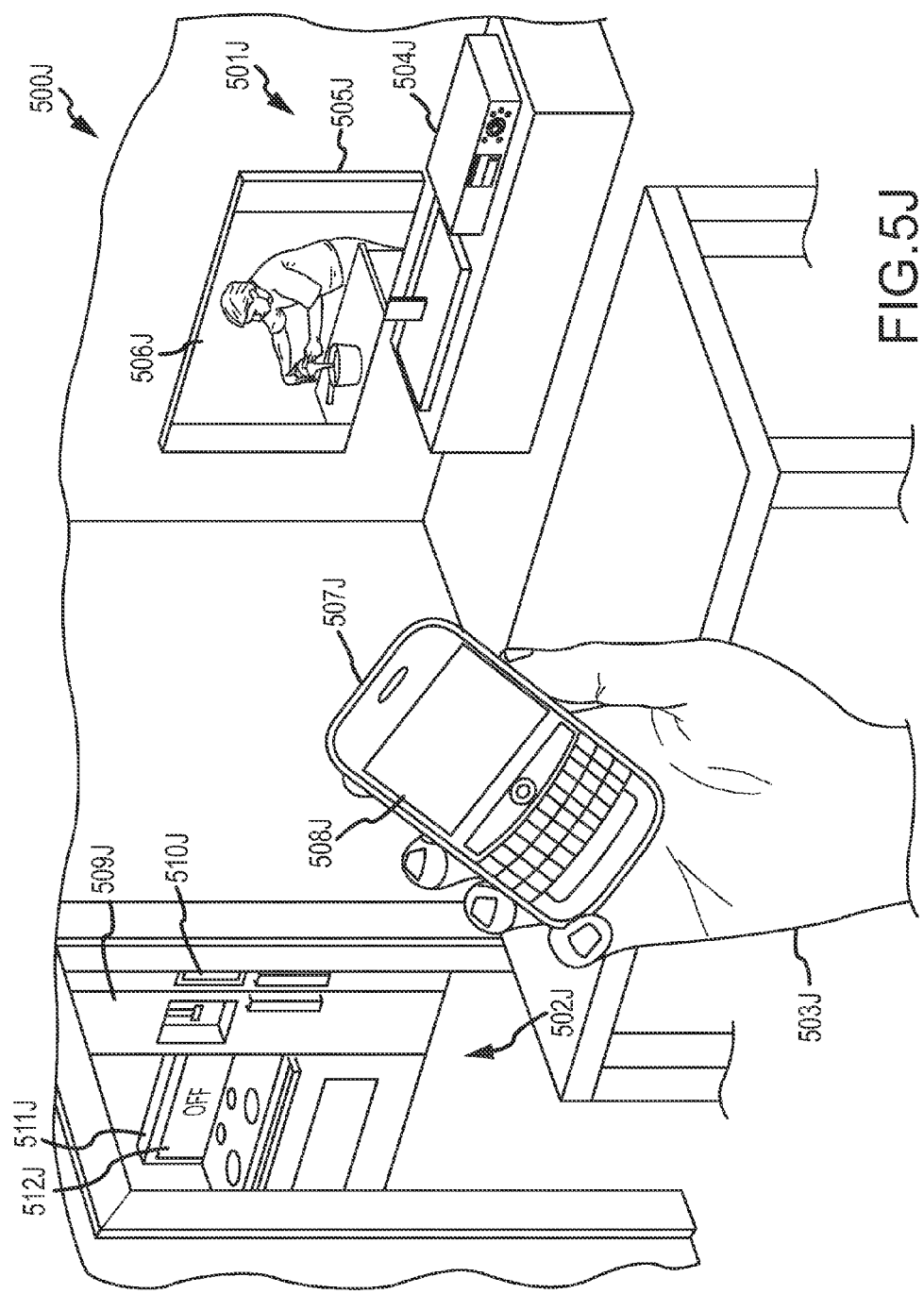

While cooking the pork chops, the oven 511H may monitor the cooking of the pork chops by taking one or more pictures of the pork chops and utilizing image evaluation software to determine from the color of the pork chops that the pork chops are done cooking prior to the cooking time indicated by the recipe. Hence, as illustrated in FIG. 5I, the oven 511I may transmit a photo of the pork chops to the smart phone 507I along with a prompt asking if the user 503I wants to turn off the oven, which the smart phone 507I may display on the smart phone screen 508I. As illustrated in FIG. 5J, the user 503J may utilize the smart phone 507J to respond affirmatively to the prompt. The smart phone may relay the user's response to the oven 511J, which may then shut itself off and display a message indicating such on the oven display 512J.

In some embodiments, the oven 511J (or another appliance, such as a stove, mixer, blender, washing machine or dryer) may actively follow instructions which are contained in or associated with the QR code 513D. For example, the oven 511J may be configured to preheat to a specific temperature and cook for a specified period of time associated with a receipt identified by the QR code 513D. Once the specified time period has been reached, the oven 511J or other appliance may be configured to shut off automatically per instructions associated with a received recipe. According to techniques described above, an appliance may modify instructions according to data collected by sensors and/or user supplied input depending on desired design criteria. In at least one embodiment, instructions associated with a recipe may be transmitted by the smart phone 507J and processed by multiple appliances. For example, an oven may be configured to preheat and/or cook according to instructions contained in a recipe. Additionally, a mixer may be configured to mix or knead ingredients for a specified period of time according to instructions associated with the recipe. Responsive to completion of the mixing/kneading operation, the user may be provided with an indicator (such as via the smart phone 507J) prompting the user to move the ingredients into the oven for cooking. In at least one embodiment, a stove may be configured to cook food at various heating levels for specified periods of time according to the receipt. The stove may be configured with a mixing magnetic device, vibration unit or other automated stirring mechanism that stirs the food periodically according to the instructions contained in the recipe. It is to be appreciated that various other cooking steps may be automated or semi-automated according to instructions associated with the QR code 513D according to desired design criteria.

In various implementations, the set top box 504J may automatically pause content being displayed on the television screen 506J of the television 505J so that the user 503J may perform various operations associated with the QR code 513D without missing part of the content. In such implementations, the set top box may pause the content in response to receiving a signal from the smart phone 507J, the oven 511J, and/or any other electronic device involved with performance of the operations associated with the QR code. For example, if a recipe associated with a cooking show presented by the set top box includes the operation of cleaning and seasoning a turkey and placing the turkey in an oven after the oven has preheated, the smart phone and/or the oven may signal the set top box to pause the cooking show when the oven starts preheating. In this way, the user may be able to prepare the turkey to be placed into the oven without having to miss part of the cooking show and/or without having to pause the cooking show himself.

In various implementations, the content presented by the set top box 504J may be pre-recorded content and may include one or more bookmarks associated with various operations that the user 503J, the oven 511J, and/or other electronic devices may perform associated with the QR code 513D. As such, the user may be able to control the set top box to present other content while one or more operations are being performed and may then utilize the one or more bookmarks to return to a place in the content related to the operation that has been completed. For example, a pre-recorded cooking show presented by the set top box may demonstrate a recipe for baking a cake and the user may bake the cake along with the show. As part of the recipe, the cake make require baking for a duration of time. The cooking show may not include the full duration of time for the baking, but may instead cut to a time when the cake is finished. As such, the user may control the set top box to view other programming while the cake is baking and, when the user's cake has finished baking, may utilize a bookmark included in the pre-recorded cooking show to return to the cooking show where the cooking show's cake has finished baking. In this way, the user is not required to pause the cooking show and sit idle until the user's cake bakes in order to be able to follow along with the cooking show in performing the remaining steps of the recipe.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for enabling interactive activity for content utilizing matrix codes, the method comprising:
    generating at least one matrix code, utilizing at least one processing unit, wherein the at least one matrix code includes information that can be utilized to perform at least one interactive activity related to at least one instance of content, wherein the information identifies at least one list of operations to perform as part of performing the at least one interactive activity;
    combining the at least one matrix code with the at least one instance of content utilizing the at least one processing unit;
    transmitting the combination of the at least one matrix code and the at least one instance of content, utilizing the at least one processing unit, to at least one display device wherein the at least one matrix code can be captured by at least one matrix code reader to initiate performance of the at least one interactive activity related to the at least one instance of content when the at least one matrix code is displayed by the at least one display device, wherein performance of the at least one interactive activity related to the at least one instance of content utilizes at least one electronic device located in a user location, the at least one electronic device other than the at least one matrix reader and an electronic device that includes the at least one processing unit;
    capturing the at least one matrix code on the at least one matrix code reader; and
    transmitting the at least one list of operations to perform from the at least one matrix code reader to the at least one electronic device.

2. The method of claim 1, wherein the at least one instance of content comprises at least one sporting event, the at least one interactive activity comprises at least one activity corresponding to at least one fantasy sporting event league associated with the at least one sporting event, and the information comprises data that enables at least one user to initiate performance of the at least one activity corresponding to the at least one fantasy sporting event league at least by capturing the at least one matrix code utilizing the at least one matrix code reader.

3. The method of claim 1, wherein the at least one instance of content comprises content related to food preparation and the at least one list of operations comprises at least one list of operations for preparing at least one food item.

4. The method of claim 1, wherein the at least one electronic device transmits at least a part of the at least one list of operations to perform to at least one additional display device.

5. The method of claim 1, wherein the at least one electronic device performs at least one first operation from the at least one list of operations and transmits at least one instruction to at least one user indicating that the at least one user is to perform at least one second operation from the at least one list of operations that is subsequent to the at least one first operation.

6. The method of claim 1, wherein the at least one electronic device detects at least one status of performance of at least one operation from the at least one list of operations utilizing at least one sensor and transmits the at least one status to at least one user.

7. The method of claim 6, wherein the at least one electronic device receives at least one user instruction from the at least one user in response to the at least one status and performs at least one action specified by the at least one user response.

8. A method for enabling interactive activity for content utilizing matrix codes, the method comprising:
  generating at least one matrix code, utilizing at least one processing unit, wherein the at least one matrix code includes information that can be utilized to perform at least one interactive activity related to at least one instance of content, wherein the information comprises at least one list of operations to perform as part of performing the at least one interactive activity;
  combining the at least one matrix code with the at least one instance of content utilizing the at least one processing unit;
  transmitting the combination of the at least one matrix code and the at least one instance of content, utilizing the at least one processing unit, to at least one display device wherein the at least one matrix code can be captured by at least one matrix code reader to initiate performance of the at least one interactive activity related to the at least one instance of content when the at least one matrix code is displayed by the at least one display device, wherein performance of the at least one interactive activity related to the at least one instance of content utilizes at least one electronic device located in a user location other than the at least one matrix reader and an electronic device that includes the at least one processing unit;
  capturing the at least one matrix code on the at least one matrix code reader; and
  transmitting the at least one list of operations to perform from the at least one matrix code reader to the at least one electronic device, wherein the at least one electronic device alters at least a portion of the at least one list of operations based on at least one location factor of the user location.

9. A system for enabling interactive activity for content utilizing matrix codes, comprising:
  an interactive activity assistance computing device, comprising:
    at least one processing unit that generates at least one matrix code, which includes information that can be utilized to perform at least one interactive activity related to at least one instance of content, and combines the at least one matrix code with the at least one instance of content, wherein the information identifies at least one list of operations to perform as part of performing the at least one interactive activity;
    at least one output component that transmits the combination of the at least one matrix code and the at least one instance of content to at least one display device;
  at least one matrix code reader, comprising:
    at least one optical detector that captures the at least one matrix code displayed by the at least one first display device; and
    at least one matrix code reader processing unit that initiates performance of the at least one interactive activity related to the at least one instance of content in response to the at least one optical detector capturing the at least one matrix code; and
  at least one electronic device that is located at a user location and is utilizable to perform at least a portion of the at least one interactive activity, wherein the at least one matrix code reader processing unit is configured to transmit the at least one list of operations to perform to the at least one electronic device utilizing at least one communication component.

10. The system of claim 9, wherein the at least one electronic device detects at least one status of performance of at least one operation from the at least one list of operations utilizing at least one sensor and transmits the at least one status to at least one user.

11. The system of claim 10, wherein the at least one electronic device receives at least one user instruction from the at least one user in response to the at least one status and performs at least one action specified by the at least one user response.

12. The system of claim 9, wherein the at least one electronic device performs at least one first operation from the at least one list of operations and transmits at least one instruction to at least one user indicating that the at least one user is to perform at least one second operation from the at least one list of operations that is subsequent to the at least one first operation.

13. The system of claim 9, wherein the at least one electronic device transmits at least a part of the at least one list of operations to perform to at least one additional display device utilizing at least one output component.

14. The system of claim 9, wherein the at least one instance of content comprises content related to food preparation and the at least one list of operations comprises at least one list of operations for preparing at least one food item.

15. The system of claim 9, wherein the at least one instance of content comprises at least one sporting event and the performance of the at least one interactive activity comprises performing at least one activity corresponding to at least one fantasy sporting event league associated with the at least one sporting event utilizing the information.

16. A method for enabling interactive activity for content utilizing matrix codes, the method comprising:
  generating at least one matrix code, utilizing at least one processing unit, wherein the at least one matrix code includes information that can be utilized to perform at least one interactive activity related to at least one instance of content, wherein the information comprises at least one list of operations to perform as part of performing the at least one interactive activity;

combining the at least one matrix code with the at least one instance of content utilizing the at least one processing unit;

transmitting the combination of the at least one matrix code and the at least one instance of content, utilizing the at least one processing unit, to at least one display device wherein the at least one matrix code can be captured by at least one matrix code reader to initiate performance of the at least one interactive activity related to the at least one instance of content when the at least one matrix code is displayed by the at least one display device, wherein performance of the at least one interactive activity related to the at least one instance of content utilizes at least one electronic device located in a user location other than the at least one matrix reader and an electronic device that includes the at least one processing unit;

capturing the at least one matrix code on the at least one matrix code reader; and transmitting the at least one list of operations to perform from the at least one matrix code reader to the at least one electronic device, wherein the at least one electronic device alters at least one operation of the at least one list of operations based on at least one location factor of the user location.

* * * * *